United States Patent
Hase et al.

(10) Patent No.: US 10,665,102 B2
(45) Date of Patent: May 26, 2020

(54) PARKING SYSTEM

(71) Applicant: DENSO CORPORATION, Kariya, Aichi-pref. (JP)

(72) Inventors: Tomomi Hase, Kariya (JP); Noriaki Ikemoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/409,909

(22) Filed: May 13, 2019

(65) Prior Publication Data

US 2019/0347934 A1 Nov. 14, 2019

(30) Foreign Application Priority Data

May 14, 2018 (JP) .................. 2018-092945

(51) Int. Cl.
*G08G 1/14* (2006.01)
*H04W 4/40* (2018.01)
*B60W 30/06* (2006.01)

(52) U.S. Cl.
CPC ............. *G08G 1/143* (2013.01); *B60W 30/06* (2013.01); *H04W 4/40* (2018.02)

(58) Field of Classification Search
CPC ......... G08G 1/143; H04W 4/40; B60W 30/06
USPC ....... 340/932.2, 933, 937, 989, 995; 701/23, 701/28, 408, 519
See application file for complete search history.

(56) References Cited

U.S. PATENT DOCUMENTS

| | | | | |
|---|---|---|---|---|
| 2012/0188101 | A1* | 7/2012 | Ganot | G07B 15/02 340/932.2 |
| 2017/0147995 | A1* | 5/2017 | Kalimi | G07F 17/246 |
| 2017/0200367 | A1 | 7/2017 | Mielenz | |
| 2018/0362023 | A1* | 12/2018 | Kim | B60W 30/06 |
| 2019/0004508 | A1* | 1/2019 | Bonander | G05D 1/0255 |
| 2019/0071070 | A1* | 3/2019 | Kato | B62D 15/0285 |

* cited by examiner

*Primary Examiner* — Tai T Nguyen
(74) *Attorney, Agent, or Firm* — Oliff PLC

(57) ABSTRACT

A parking system includes first and second communicators. The first communicator is configured to be mounted on a vehicle and perform communication. The second communicator is configured to be mounted on a communication device owned by a user and perform communication. The first and second communicators are configured to communicate with a wireless communication service in a mutually exclusive manner by using the same information as service setting information. At least one of the vehicle and the communication device enables the first communicator in the vehicle to communicate by using the wireless communication service in at least one of a first period during execution of automatic parking, and a second period during execution of pick-up traveling, by transmitting a switching request for switching an active communicator in the wireless communication service, to a management apparatus managing a relationship between the service setting information and a related communicator.

8 Claims, 13 Drawing Sheets

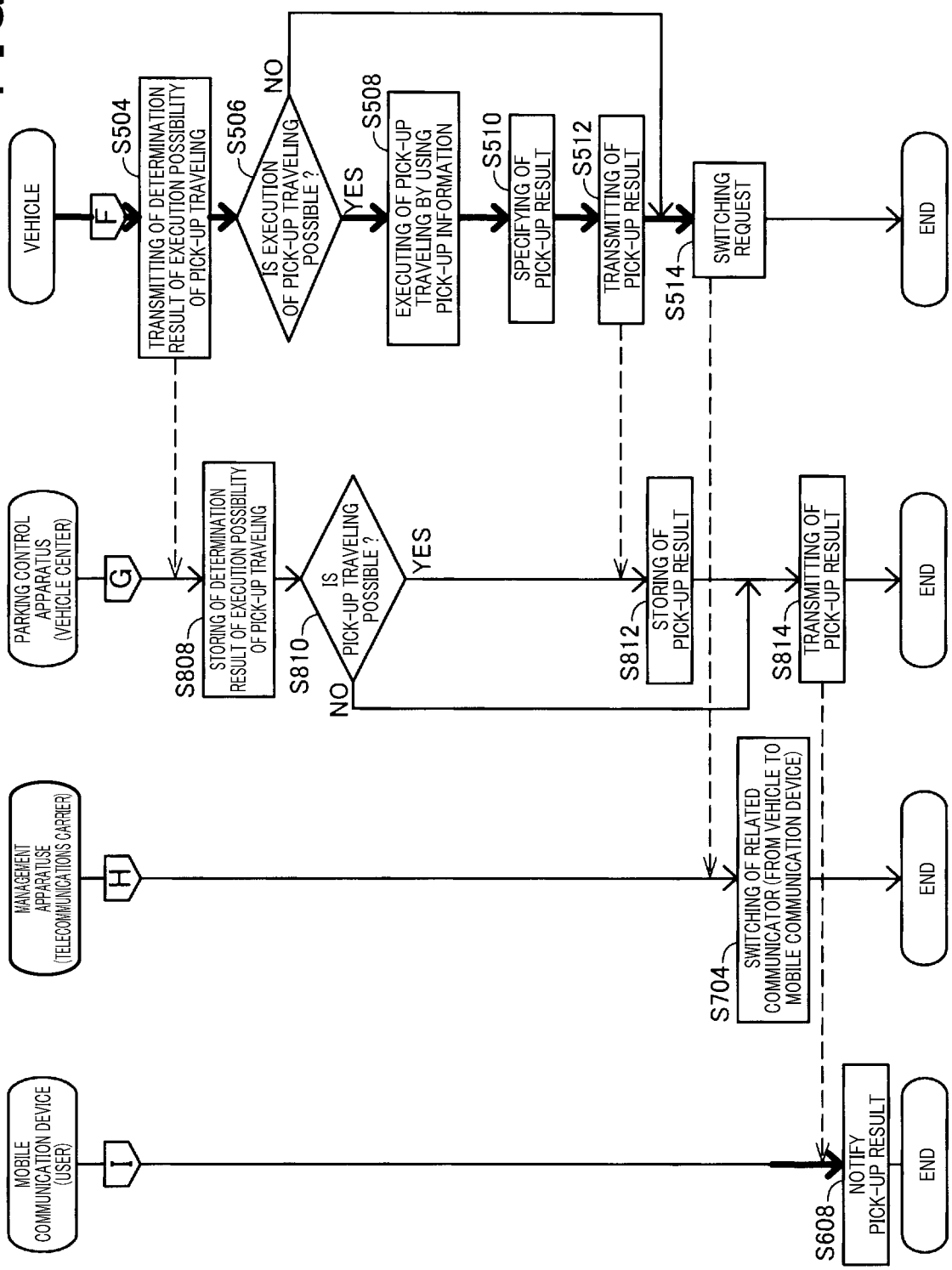

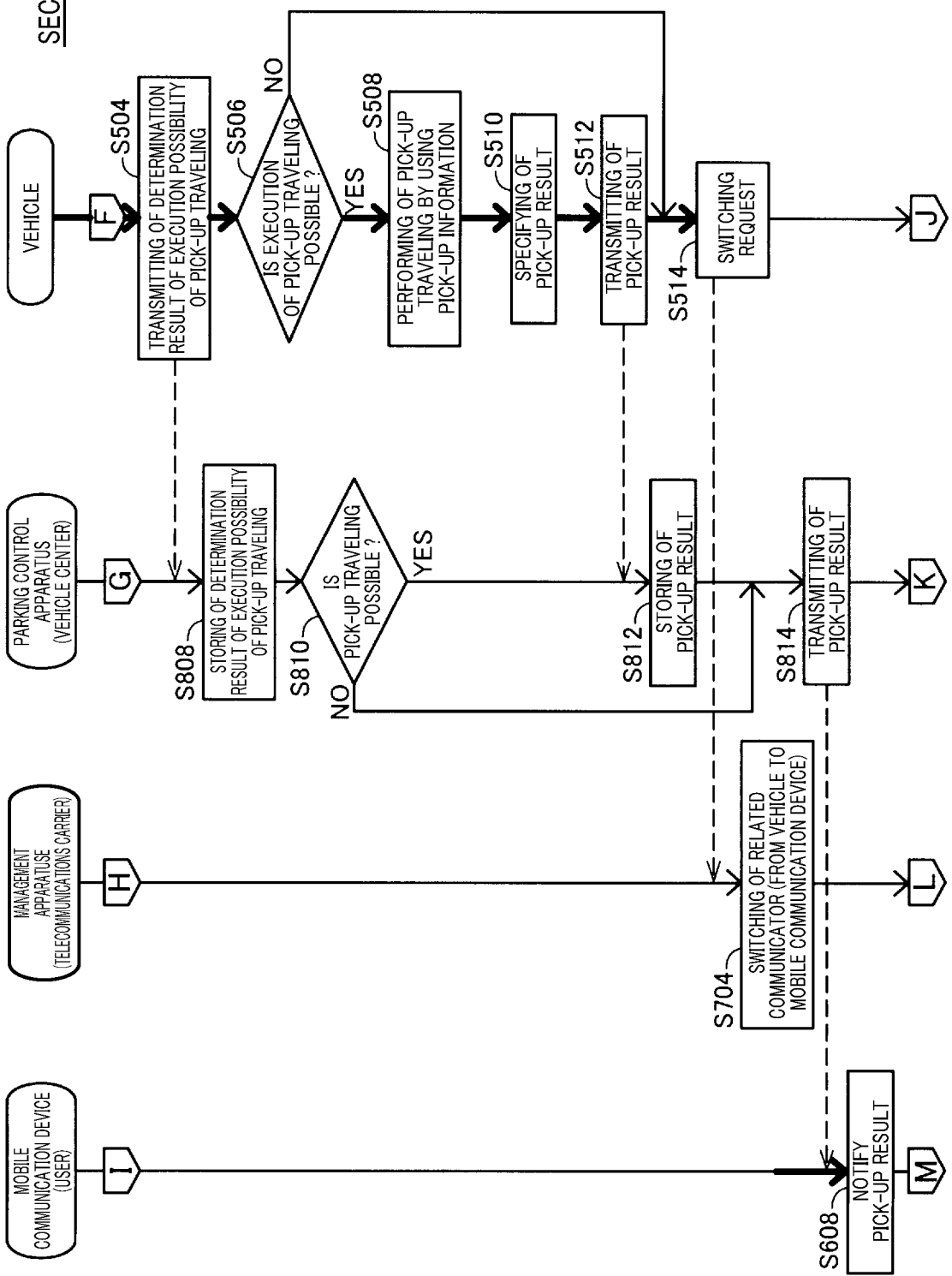

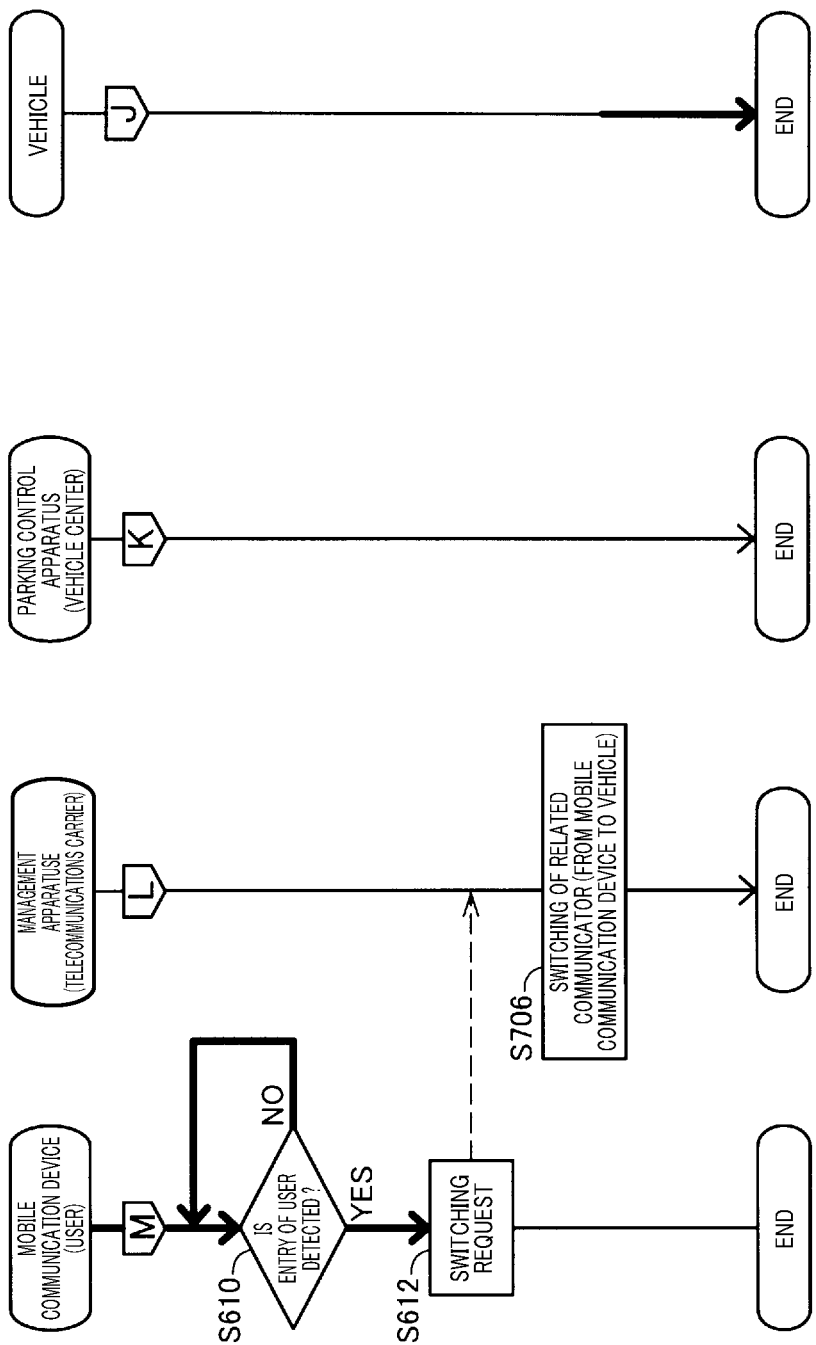
FIG.9 SECOND EMBODIMENT

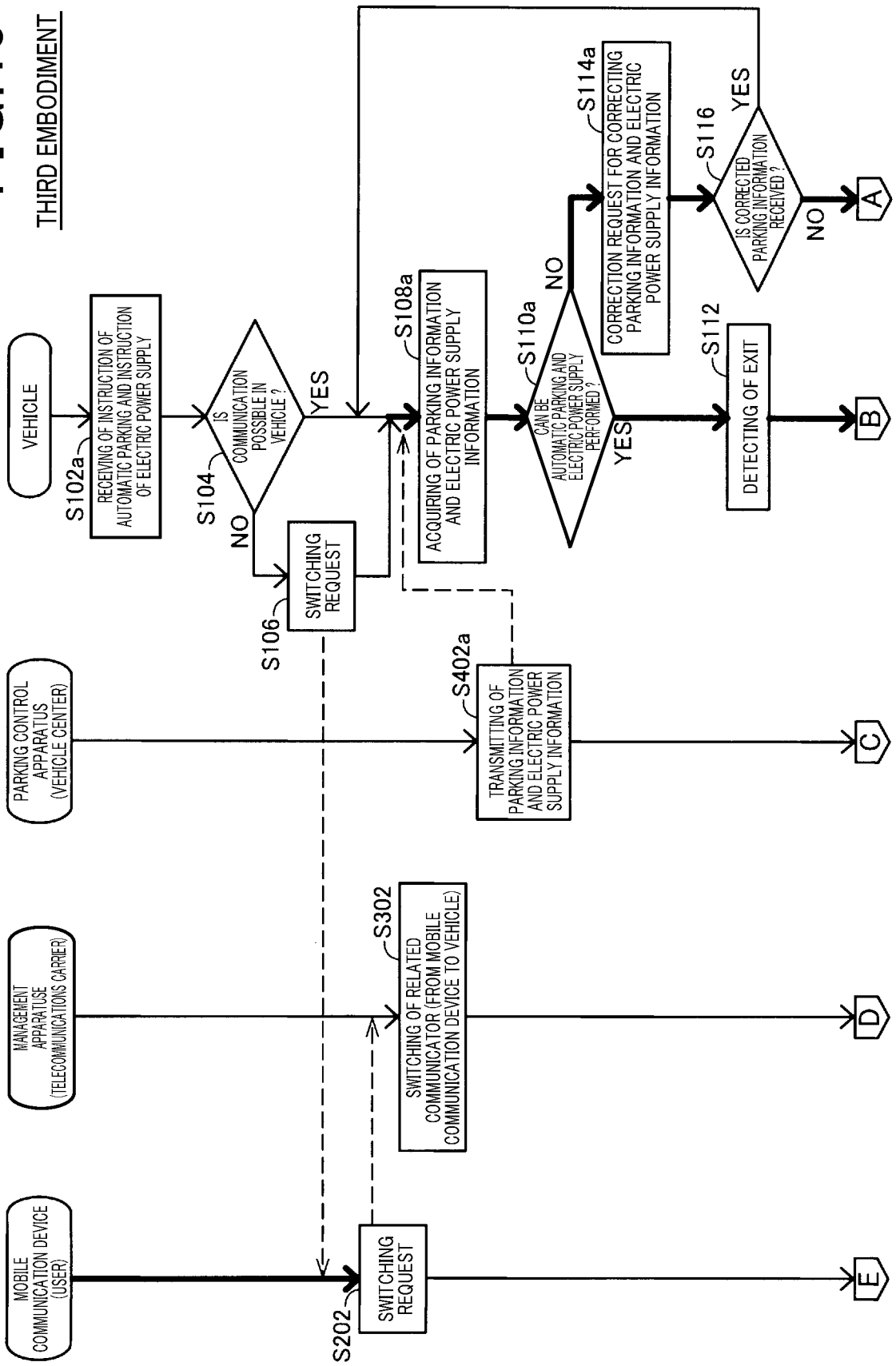
FIG.10 THIRD EMBODIMENT

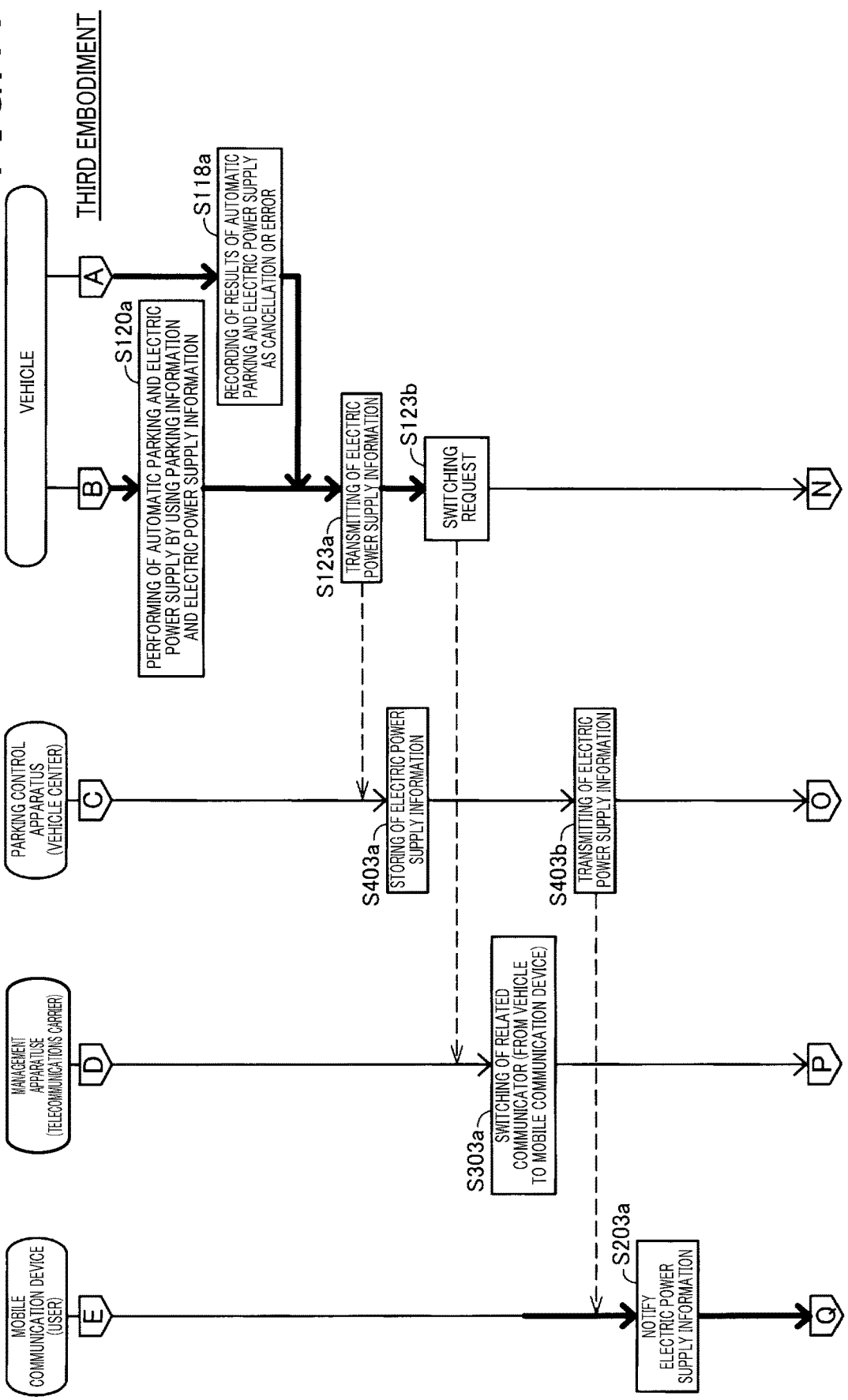

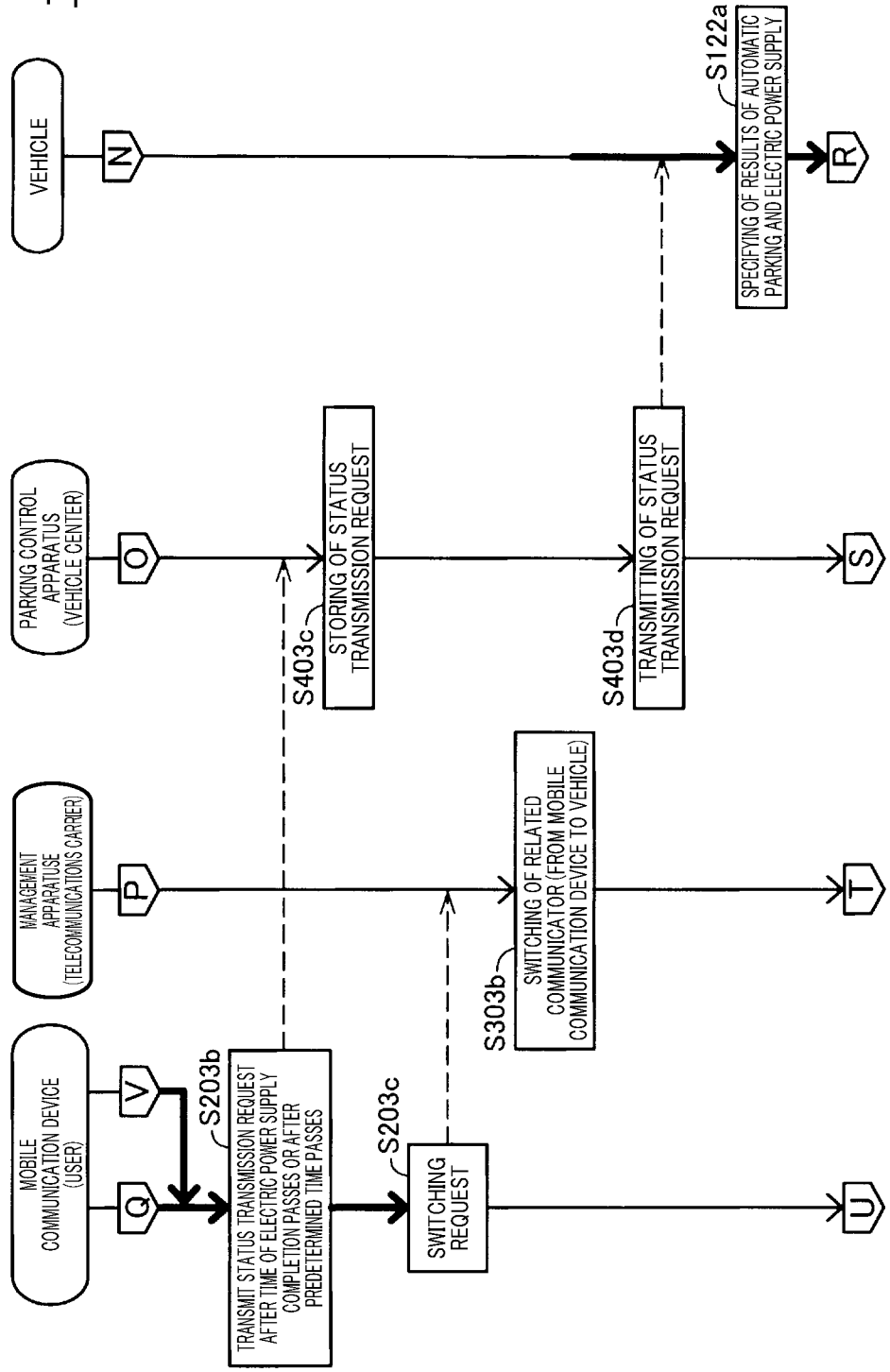

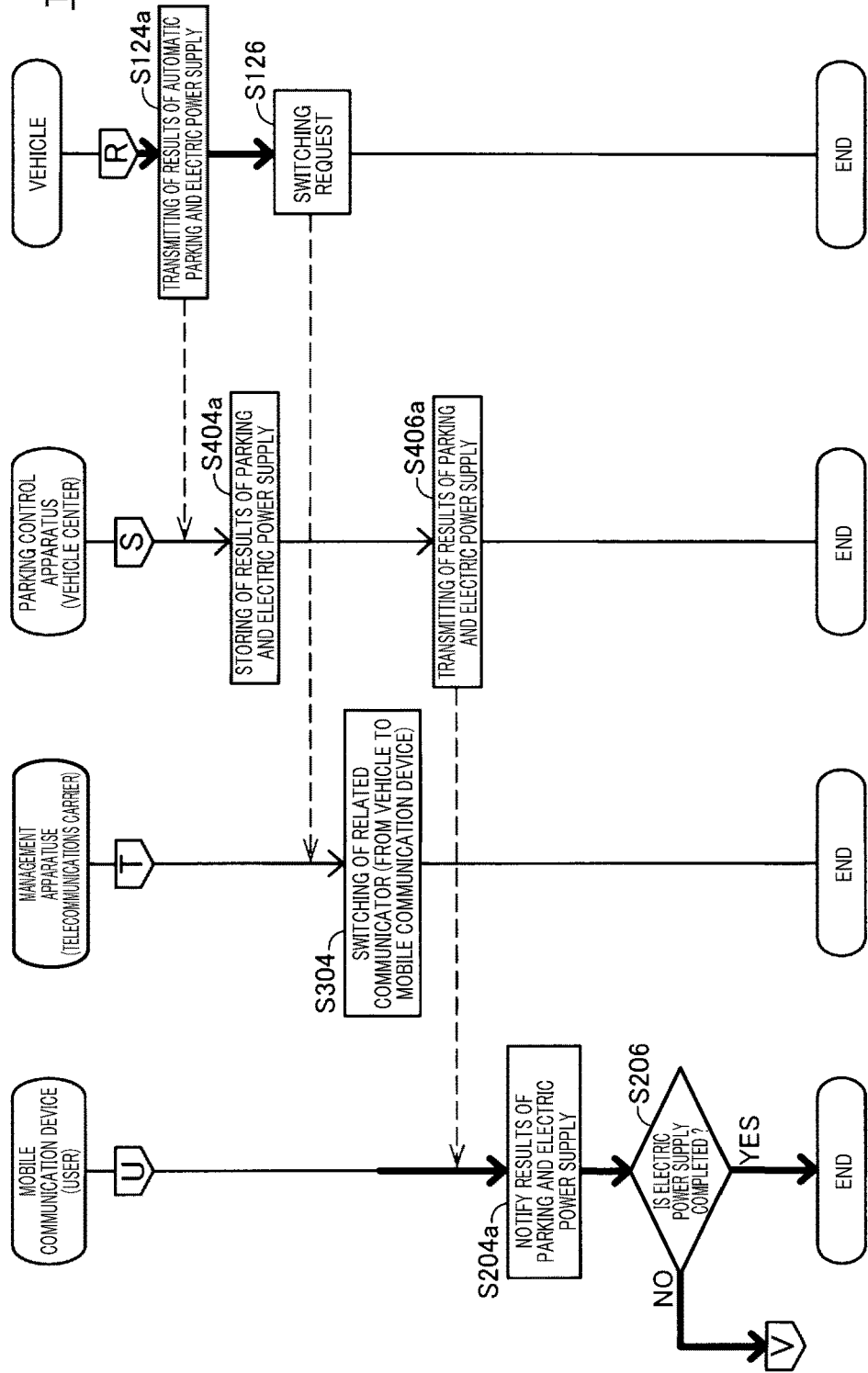

PARKING SYSTEM

CROSS-REFERENCE TO RELATED APPLICATION

This application is based on and claims the benefit of priority from earlier Japanese Patent Application No. 2018-092945 filed May 14, 2018 the description of which is incorporated herein by reference.

BACKGROUND

1. Technical Field

The present disclosure relates to parking of a vehicle by automatic driving.

2. Related Art

As automatic driving technologies for vehicles have developed, there has been proposed a system for automatic driving to a parking lot at a place away from a place where a user exits a vehicle, and executing parking.

SUMMARY

The present disclosure provides a parking system. In the present disclosure, a parking system includes first and second communicators. The first communicator is configured to be mounted on a vehicle and perform communication. The second communicator is configured to be mounted on a communication device owned by a user of the vehicle and perform communication. The first and the second communicators are configured to be able to communicate with a wireless communication service in a mutually exclusive manner, by using the same information as service setting information. At least one of the vehicle and the communication device transmits a switching request for switching of an active communicator that is a communicator related to the service setting information to a management apparatus managing a relationship between the service setting information and a related communicator. Accordingly, at least one of the vehicle and the communication device enables the first communicator to communicate by using the wireless communication service in at least one of a first period during execution of automatic parking, and a second period during execution of pick-up traveling.

BRIEF DESCRIPTION OF THE DRAWINGS

In the accompanying drawings:

FIG. 7 is a partial sequence diagram showing a procedure of the automatic pick-up process in the first embodiment;

FIG. 8 is a partial sequence diagram showing a procedure of an automatic pick-up process in a second embodiment;

FIG. 9 is a partial sequence diagram showing a procedure of the automatic pick-up process in the second embodiment;

FIG. 10 is a partial sequence diagram showing a procedure of an automatic parking process in a third embodiment;

FIG. 11 is a partial sequence diagram showing a procedure of the automatic parking process in the third embodiment;

FIG. 12 is a partial sequence diagram showing a procedure of the automatic parking process in the third embodiment; and FIG. 13 is a partial sequence diagram showing a procedure of the automatic parking process in the third embodiment.

DETAILED DESCRIPTION OF THE PREFERRED EMBODIMENTS

Figure 1:
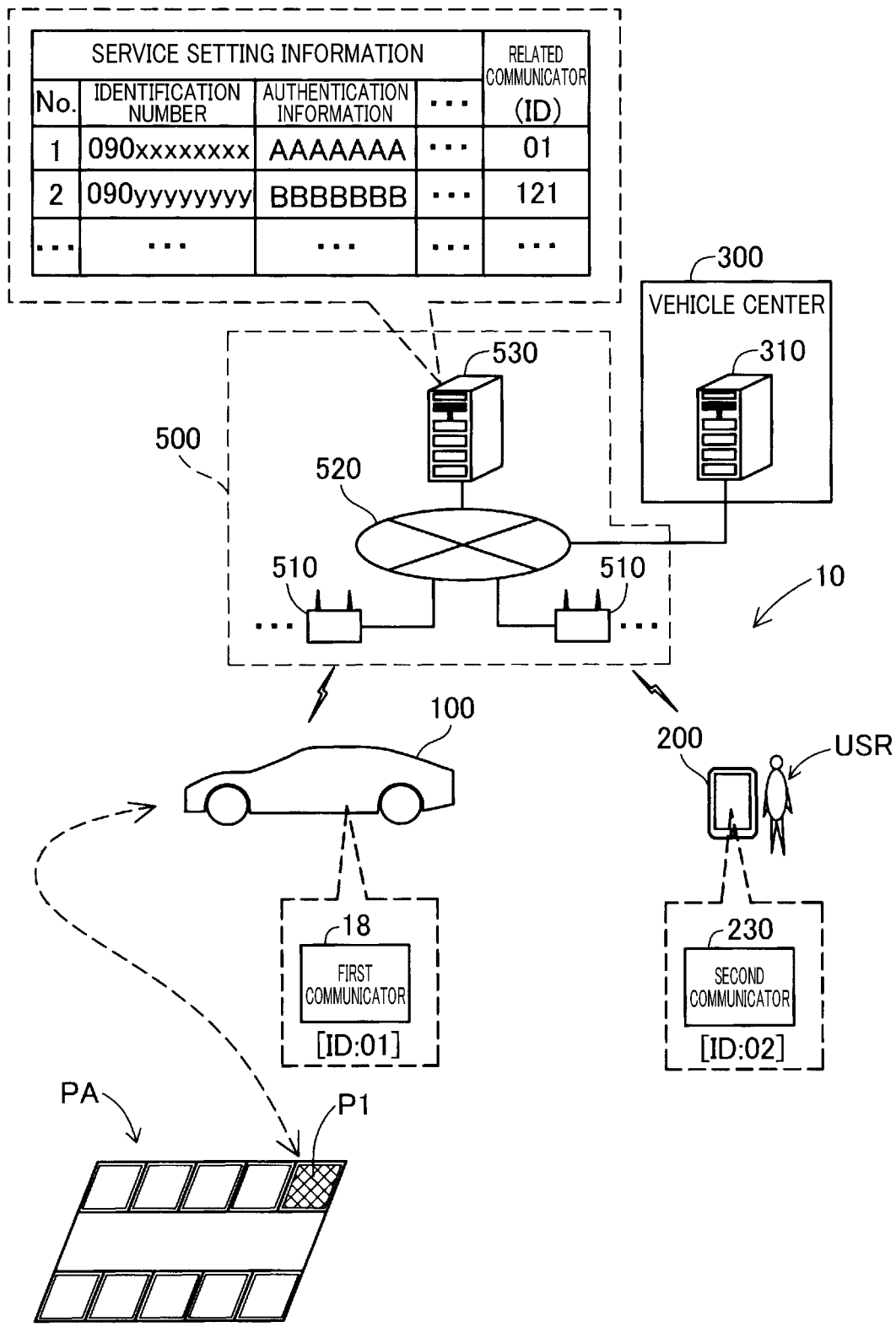
FIG. 1 is a view of showing a schematic configuration of a parking system according to an embodiment of the present disclosure.

The inventor of the present disclosure has studied the following technique as a parking system for being capable of executing communication by a user-owned communication device, and at least one of automatic parking and pick-up traveling, by using communication based on a single contract of a wireless communication service.

Japanese Unexamined Patent Application Publication (Translation of PCT Application) No. 2017-526569 proposes a parking system (valet parking system) including a parking space sensor configured as a video camera disposed in a parking lot and a central control unit configured by a computer. In the parking system, the central control unit allocates an empty space to a vehicle based on the occupancy state of the parking space, which is detected by the parking space sensor, and transmits a trajectory (route information) to the allocated empty space, to the vehicle by wired or wireless transmission.

In the above-described parking system, communication between the central control unit and the vehicle is configured to be performed by using a wireless communication service provided by a telecommunications carrier, such as the 4th generation mobile communication system (4G) and Long Term Evolution (LTE). In order to realize the communication, a communication device such as a smartphone owned by a user may be used. In this configuration, the communication between the communication device of the user and the vehicle may be realized by, for example, a wireless LAN or a Bluetooth (registered trademark) interface. The central control unit and the vehicle can communicate with each other by tethering. However, in such a configuration, when the user exits the vehicle with the communication device, there is a problem that the vehicle and the central control unit cannot communicate with each other, and the vehicle cannot be parked. In addition, in a configuration in which wireless communication between the central control unit and the vehicle is performed without using a wireless communication service provided by a telecommunications carrier, for example, in a configuration performed by a wireless LAN or a Bluetooth (registered trademark) interface, there is a problem that the vehicle cannot be parked unless a communication facility using a wireless LAN or a Bluetooth interface is provided in the parking lot. Moreover, in a configuration in which the vehicle performs wireless communication using a wireless communication service provided by a telecommunications carrier independently of a communication device of the user, there is a problem that the user must make contracts for multiple wireless communication services, so that the operational cost becomes high. Such problems may occur not only in automatic parking in which a vehicle is being parked in a parking lot by automatic driving, but also in pick-up traveling in which a parked vehicle is automatically driven to a preset position. Thus, there is a demand for establishment of a technology capable of executing communication by a user-owned communication device, and at least one of automatic parking and pick-up traveling, by using communication using a single wireless communication service contract.

The technique of the present disclosure can be realized as the following mode.

In accordance with an aspect of the present disclosure, there is provided a parking system including first and second communicators. The first communicator is configured to be mounted on a vehicle and perform communication using a wireless communication service. The second communicator is configured to be mounted on a user-owned communication device owned by a user of the vehicle and perform communication using the wireless communication service. The first and second communicators are configured to be able to communicate with the wireless communication service in a mutually exclusive manner, i.e. not both simultaneously, by using the same information as service setting information including an identification number and authentication information for the wireless communication service. At least one of the vehicle and the user-owned communication device transmits a switching request for switching of an active communicator that is a communicator related to the service setting information to a management apparatus managing a relationship between the service setting information and a related communicator. Accordingly, at least one of the vehicle and the user-owned communication device enables the first communicator to communicate by using the wireless communication service in at least one of a first period during execution of automatic parking in which the vehicle is being parked by automatic driving, and a second period during execution of pick-up traveling in which the vehicle travels from a parked position of the vehicle to a set position by automatic driving.

In accordance with the parking system of the aspect, at least one of the vehicle and the user-owned communication device transmits the switching request for switching of the active communicator to the management apparatus, so that the first communicator can communicate by using the wireless communication service in at least one of the first period during the executing of the automatic parking and the second period during the executing of the pick-up traveling. As a result, the communication by the user-owned communication device and at least one of the automatic parking and the pick-up traveling can be executed by using the communication based on a single contract of the wireless communication service.

The present disclosure may also be realized in various forms other than the parking system. For example, the present disclosure may be realized in the form of a vehicle, a communication device, a control method of the vehicle, the device, or the parking system, a parking method, a computer program for realizing the methods, or a storage medium (non-transitory tangible computer-readable recording medium) storing the computer program.

The foregoing and other features and advantages of the present disclosure will become more apparent in the light of the following detailed description of preferred embodiments thereof as discussed and illustrated in the accompanying drawings.

A. First Embodiment

A1. System Configuration

A parking system 10 shown in FIG. 1, includes a vehicle 100, a mobile communication device 200 owned by a user USR of the vehicle 100, and a parking control apparatus 310. The parking system 10 parks the vehicle 100 in a parking space P1 in a parking lot PA by automatic driving after the user USR exits the vehicle 100. The parking system 10 controls the vehicle 100 to travel from the parking space P1 to a place designated by the user USR by automatic driving in accordance with a pick-up instruction from the user USR. In the present embodiment, a process of controlling the vehicle 100 to perform the automatic driving and park the vehicle 100 in the parking space P1 in the parking lot PA is referred to as "automatic parking". A process of controlling the vehicle 100 to travel from the parking space P1 to the place designated by the user USR by the automatic driving is referred to as "pick-up traveling".

As shown in FIG. 1, the vehicle 100 includes a first communicator 18. The mobile communication device 200 includes a second communicator 230. The first communicator 18 and the second communicator 230 can communicate by using a wireless communication service provided by a telecommunications carrier 500. The wireless communication service may be a communication service that will be available in the future, for example, a 5th generation mobile communication system (5G), in addition to a wireless communication service already provided when the application of the present disclosure is filed, such as a communication service using a 4th generation mobile communication system (4G) or Long Term Evolution (LTE). In the first communicator 18 and the second communicator 230 in the present embodiment, the same information is set as service setting information in the wireless communication service. For the reason, the first communicator 18 and the second communicator 230 are configured to be able to communicate with the wireless communication service exclusively, i.e. not both at the same time. Both the first and second communicators 18 and 230 can communicate with the wireless communication service but only one can do so at any particular instant in time. That is, when the first communicator 18 performs communication using the wireless communication service by using the service setting information, the second communicator 230 cannot perform communication using the wireless communication service. The service setting information is information including an identification number and authentication information for the wireless communication service, and means information to be set for using the wireless communication service. For example, the service setting information in the 4G wireless communication service, corresponds to the International Mobile Subscriber Identity (IMSI) and the Mobile Subscriber Integrated Service Digital Network Number (MSISDN), which are stored in a Subscriber Identity Module Card (SIM). The service setting information is included in data outputted from the communicator when communication is performed by using the wireless communication service. Thus, the same service setting information is set in the first communicator 18 and the second communicator 230, so that only a single contract is needed for the wireless communication service between the user USR and the telecommunications carrier 500. The first communicator 18 and the second communicator 230 have each an Identifier (ID) that is unique to an apparatus or a device, using the wireless communication service and that is set in advance. In the present embodiment, the ID:01 is set for the first communicator 18, and the ID:02 is set for the second communicator 230. In the present embodiment, the ID of the communicator is set as a value with two digits for the sake of convenience of description. The ID of each of the communicators 18 and 230 is an identifier corresponding to the Integrated Circuit Card ID (ICCID) in the 4G wireless communication service, and is information that can specify the communicator that performs communication using the wireless communication service. The ID is included in data outputted from the communicator when communication is performed by using the wireless communication service.

The telecommunications carrier 500 includes a number of base stations 510, a network 520 connecting the base stations 510, and a management apparatus 530 connected to the network 520. The base stations 510 perform wireless communication with the communicators such as the first communicator 18 and the second communicator 230. The base stations 510 convert radio signals received from the communicators into signals of a format communicated in the network 520 and output the signals to the network 520. The network 520 includes a transmission apparatus that transmits signals transmitted from each base station 510 and a switching apparatus that assembles data from the signals and outputs the data to an addressed apparatus or device. The management apparatus 530 manages a relationship between each piece of service setting information and a communicator related to each piece of service setting information (hereinafter, referred to as related communicator). Specifically, as shown in FIG. 1, the management apparatus 530 stores each piece of service setting information including identification information and authentication information relative to the ID of each piece of related communicator. As described later, the relationship may be changed. In the example of FIG. 1, the service setting information: 1 is related to the related communicator: 01, that is, the first communicator 18 in the vehicle 100. In the network 520, the management apparatus 530 determines whether data received via the base stations 510 is data to be transmitted to the wireless communication service based on the relationship managed in the management apparatus 530. Specifically, in the example of FIG. 1, the communicator has transmitted data including each information having the service setting information: 1. If the ID of this communicator corresponding to the data transmission source is "01" (ID: 01), the data is determined to be data which should be transmitted to the wireless communication service. In the case, the first communicator 18 of the vehicle 100 (the related communicator: 01) can perform communication. On the other hand, the communicator has transmitted data including each information having the service setting information: 1. If the ID of this communicator corresponding to the data transmission source is "02" (ID: 02), the data is determined not to be data which should be transmitted to the wireless communication service due to the service setting information: 1 being related to the related communicator: 01. In the case, the second communicator 230 of the mobile communication device 200 (the related communicator: 02) cannot perform communication.

A parking control apparatus 310 is installed in a vehicle center 300. The vehicle center 300 is an organization that manages automatic parking and pick-up parking. The parking control apparatus 310 manages automatic parking and pick-up traveling. The parking control apparatus 310 is connected to the network 520 of the telecommunications carrier 500 and is configured to be able to communicate with the vehicle 100 and the mobile communication device 200 via the network 520, that is, by using the wireless communication service. The parking control apparatus 310 manages exchanges of execution results of automatic parking (hereinafter referred to as parking result) and execution results of pick-up traveling (hereinafter referred to as pick-up result), between the vehicle 100 and the mobile communication device 200. The parking control apparatus 310 transmits parking information for controlling automatic parking and pick-up information for controlling pick-up traveling by the vehicle 100. The parking information includes the position of the parking lot PA, the position of the parking space P1 in the parking lot PA, and information on the region in which the vehicle can be parked in the parking space. The pick-up information includes arrival position information and route information from the parking space P1 to the arrival position. In the present embodiment, the user USR can register parking information and pick-up information in the parking control apparatus 310 in advance. The parking control apparatus 310 may be configured to be included in the telecommunications carrier 500. For example, the parking control apparatus 310 and the management apparatus 530 may be configured as a single apparatus. The parking control apparatus 310 corresponds to a subordinate concept of an external apparatus in the present disclosure.

Figure 2:
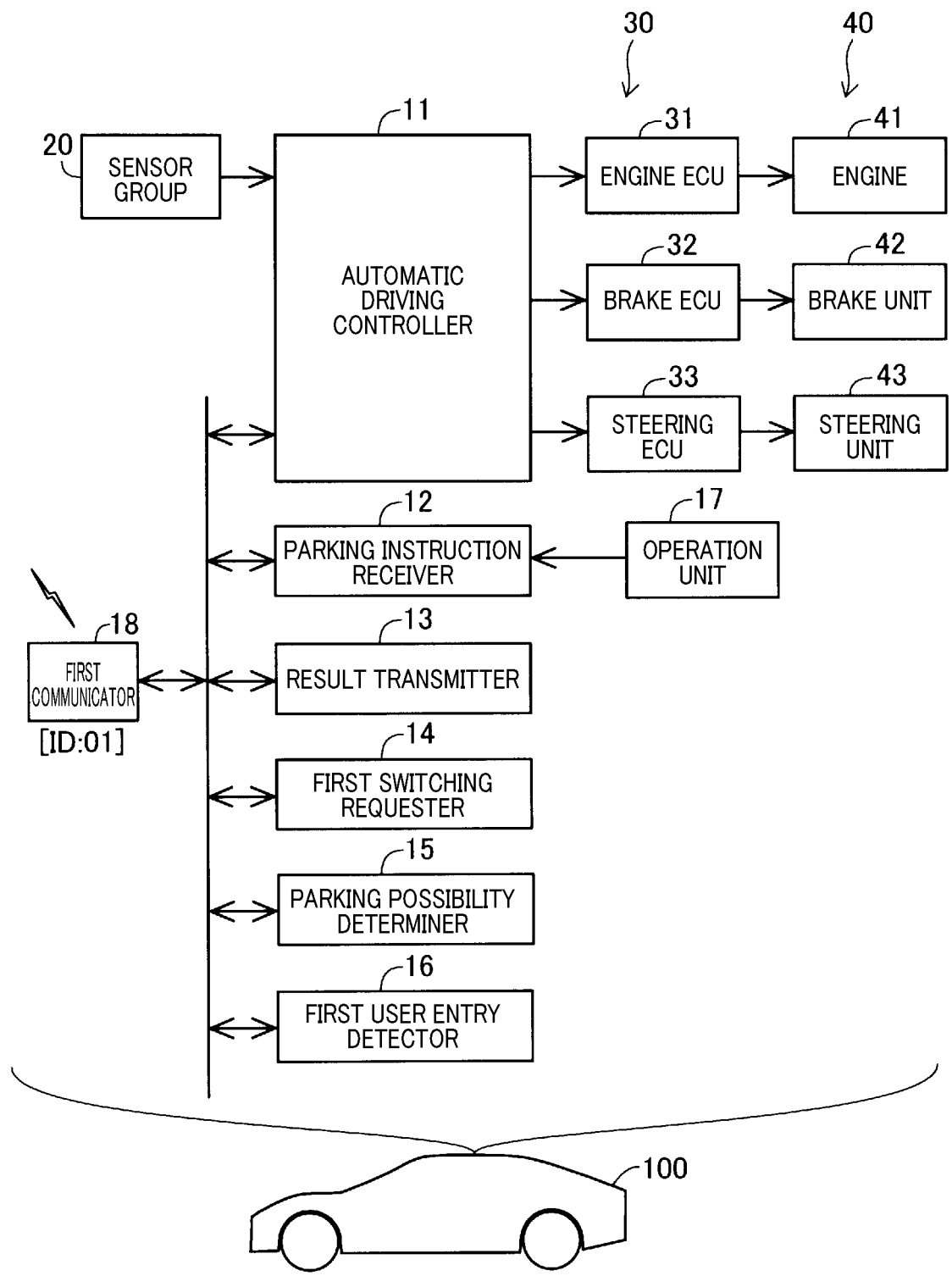
FIG. 2 is a block diagram showing a schematic configuration of a vehicle.

As shown in FIG. 2, the vehicle 100 includes the first communicator 18 described above. The first communicator 18 is configured to be able to perform communication using the wireless communication service of the telecommunications carrier 500 and is configured to be able to perform communication using a wireless LAN. In addition, the first communicator 18 is configured to function as a router device. Specifically, the first communicator 18 can transmit data received by wireless LAN communication, by communication using the wireless communication service of the telecommunications carrier 500. Moreover, the first communicator 18 can transmit data received by communication using the wireless communication service, by the wireless LAN.

The vehicle 100 includes an automatic driving controller 11, a parking instruction receiver 12, a result transmitter 13, a first switching requester 14, a parking possibility determiner 15, a first user entry detector 16, an operation unit 17, a sensor group 20, a drive control Electronic Control Unit (ECU) group 30, and a drive unit 40, in addition to the first communicator 18 described above.

The automatic driving controller 11 controls the drive control ECU group 30 to control the vehicle 100 to perform automatic driving in accordance with an execution instruction of automatic driving. At the time, the automatic driving controller 11 uses a detection result received from the sensor group 20 to perform the automatic driving. The automatic driving controller 11 performs the automatic driving based on the route information included in the parking information or in the pick-up information. In the present embodiment, the automatic driving controller 11 is configured by a single ECU.

The parking instruction receiver 12 receives the execution instruction of the automatic driving. The result transmitter 13 transmits a parking result and a pick-up result via the first communicator 18. The first switching requester 14 transmits a request for switching the active communicator (hereinafter, referred to as switching request) via the first communicator 18. The parking possibility determiner 15 determines whether automatic parking can be executed based on the parking information. The first user entry detector 16 detects entry of the user USR to the vehicle 100. In the present embodiment, the user entry detection is executed by using a detection result of a weight sensor (not shown) that detects a weight on each seat. However, the user entry detection may be executed based on a captured image acquired by a camera that captures the inside of the vehicle instead of the detection result of the weight sensor.

In the present embodiment, the parking instruction receiver 12, the result transmitter 13, the first switching requester 14, the parking possibility determiner 15, and the first user entry detector 16, described above, are configured by a single ECU. The functional units described above may be configured by a plurality of ECUs. At least a part of the functional units may be configured by the same ECU as the automatic driving controller 11.

The operation unit 17 is operated when the user USR gives an instruction for automatic parking. In the present embodiment, the operation unit 17 is configured by a physical switch disposed on an instrument panel of the vehicle 100. The operation unit 17 may be configured by a software switch displayed on a monitor device disposed on the instrument panel, instead of the physical switch. The operation unit 17 may be included in the mobile communication device 200. In this configuration, the instruction for the automatic parking inputted from the operation unit 17 may be transmitted to the vehicle 100 via the second communicator 230 included in the mobile communication device 200.

The sensor group 20 includes a number of sensors that detect various parameters necessary for automatic driving. Specifically, the sensor group 20 may include a vehicle speed sensor, an acceleration sensor, a Global Navigation Satellite System (GNSS) sensor, an imaging camera, a millimeter wave radar, a Light Detection and Ranging (LiDAR) sensor, a yaw rate sensor, and a steering angle sensor.

The drive control ECU group 30 includes an engine ECU 31, a brake ECU 32, and a steering ECU 33. The drive unit 40 includes an engine 41, a brake unit 42, and a steering unit 43. The engine ECU 31 controls the engine 41. Specifically, the engine ECU 31 controls various actuators (not shown) to perform an opening and closing operation of a throttle valve, an ignition operation of an igniter, and an opening and closing operation of an intake valve. The brake unit 42 includes a group of devices (actuators) related to brake control, such as sensors, motors, valves and pumps. The brake ECU 32 determines a timing to apply a brake and a braking amount, and controls each device constituting the brake unit 42 so that the determined braking amount can be acquired at the determined timing. The steering unit 43 includes a group of devices (actuators) related to steering, such as a power steering motor. The steering ECU 33 determines a steering amount (steering angle) based on measurement values acquired from the yaw rate sensor and the steering angle sensor mounted on the vehicle 100, and controls each device constituting the steering unit 43 so that the determined steering amount is acquired. When the vehicle 100 is a Hybrid Electric Vehicle (HEV) or an Electric Vehicle (EV), the drive unit 40 may include a motor, and the drive control ECU group 30 may include a motor ECU that controls the motor.

Figure 3:
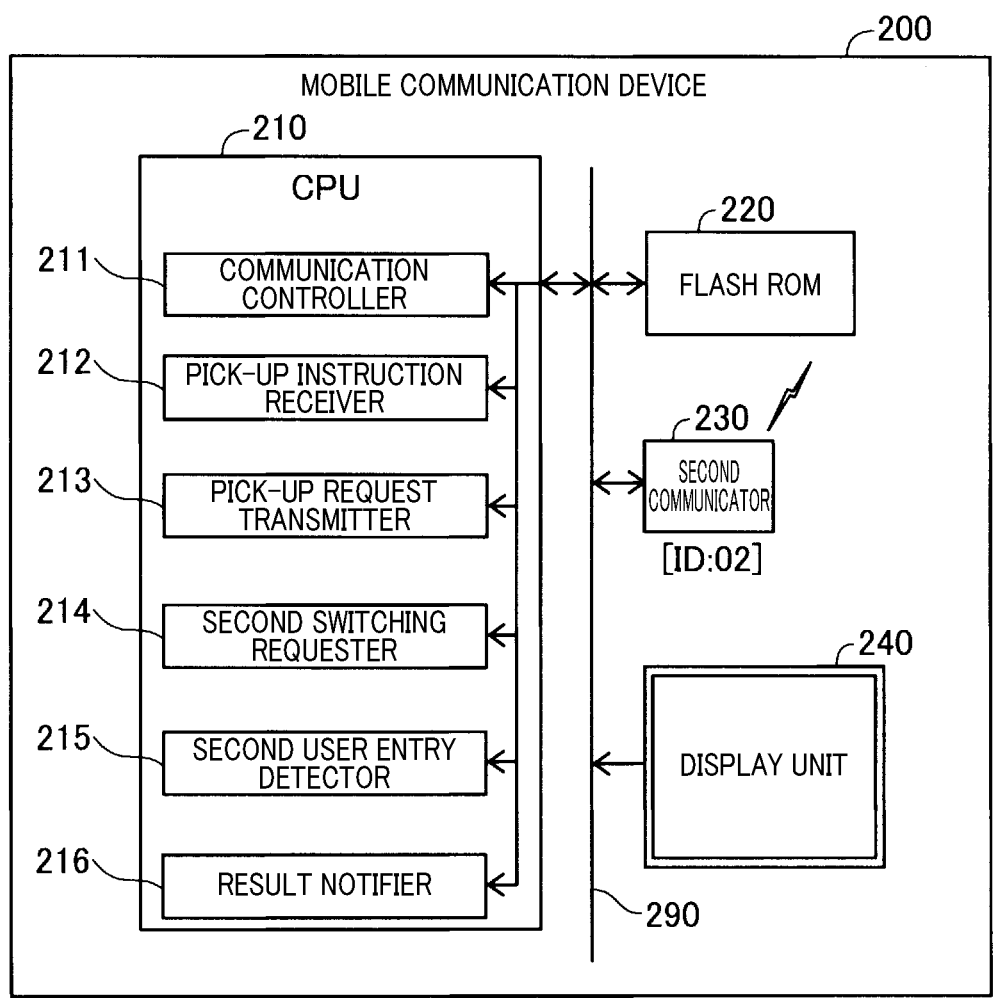
FIG. 3 is a block diagram showing a schematic configuration of a mobile communication device as an embodiment of a user-owned communication device in the present disclosure.

In the present embodiment, the mobile communication device 200 shown in FIG. 3 is configured by a smartphone. The mobile communication device 200 includes a CPU 210, a flash ROM 220, and a display unit 240 in addition to the above-described second communicator 230. The CPU 210, the flash ROM 220, the second communicator 230, and the display unit 240 are configured to be able to communicate with each other by an internal bus 290.

The CPU 210 executes a control program stored in the flash ROM 220 so as to serve as a communication controller 211, a pick-up instruction receiver 212, a pick-up request transmitter 213, a second switching requester 214, a second user entry detector 215, and a result notifier 216. The communication controller 211 controls communication using a wireless communication service. The pick-up instruction receiver 212 receives a pick-up instruction for pick-up by the vehicle 100, which is an execution instruction of the pick-up traveling. Specifically, the pick-up instruction receiver 212 controls the display unit 240 to display a menu screen for instructing pick-up traveling, and detects a selection operation for pick-up traveling from the user USR on the menu screen, so that the pick-up instruction for pick-up by vehicle 100, is received. The pick-up request transmitter 213 transmits a pick-up request for pick-up by the vehicle to the parking control apparatus 310 via the second communicator 230 in accordance with the pick-up instruction. The second switching requester 214 transmits a switching request via the second communicator 230 similarly to the first switching requester 14 in the vehicle 100. The second user entry detector 215 detects entry of the user USR to the vehicle 100. In the present embodiment, the user entry detection is executed based on the fact that reception strength of wireless LAN signals outputted by the first communicator 18 is equal to a predetermined strength or greater. The result notifier 216 notifies the user USR of a parking result by displaying the parking result on the display unit 240. The mobile communication device 200 corresponds to a subordinate concept of the user-owned communication device in the present disclosure.

In the parking system 10 having the above-described configuration, an automatic driving process described later is executed, so that the vehicle 100 can be automatically parked in the parking space P1 by using communication based on a single contract of the wireless communication service. An automatic pick-up process described later is executed, so that the vehicle 100 parked in the parking space P1 can be automatically driven to a position set by the user USR, by using the communication based on the single contract.

A2. Automatic Parking Process

Figure 4:
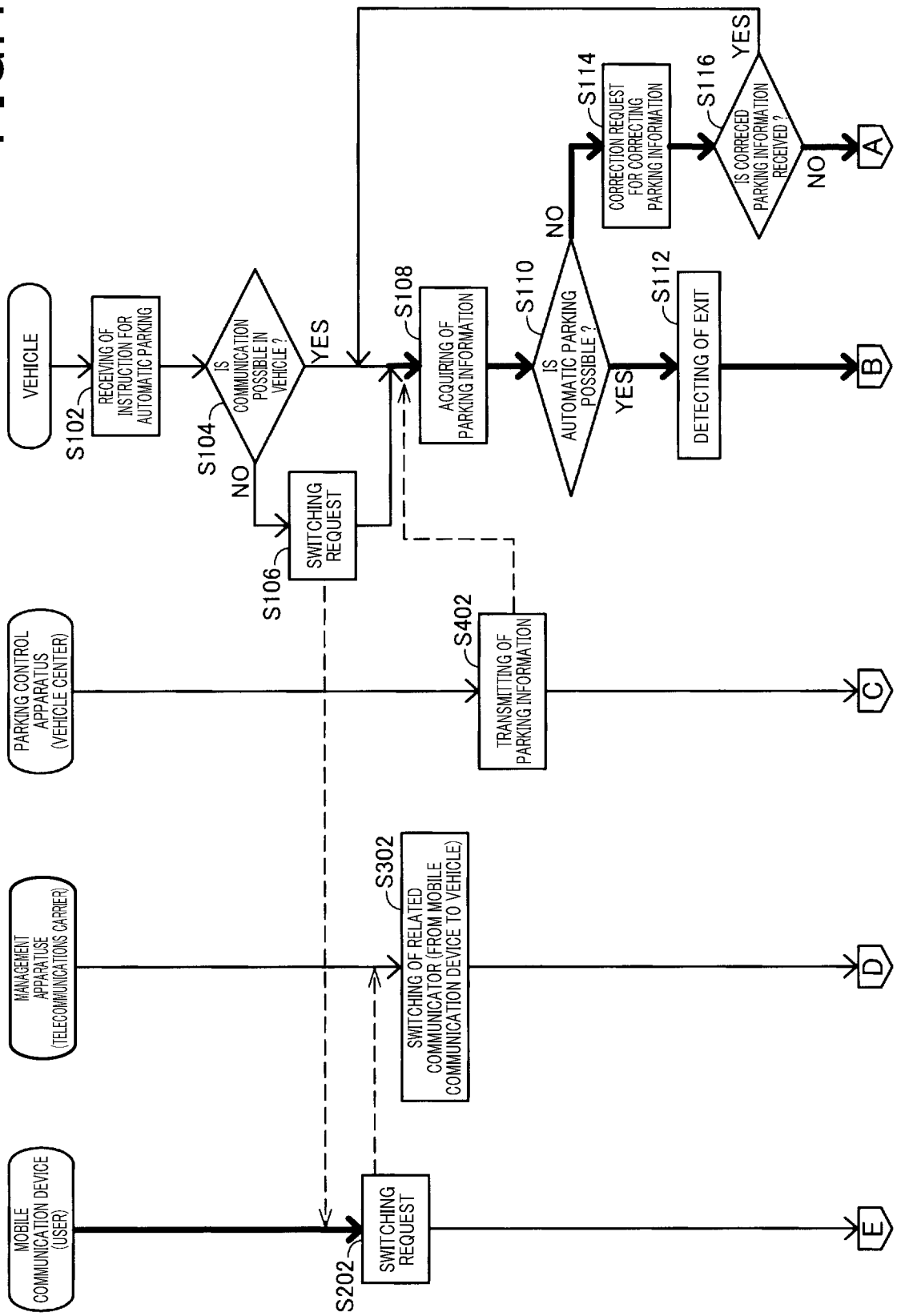
FIG. 4 is a partial sequence diagram showing a procedure of an automatic parking process in a first embodiment.
Figure 5:
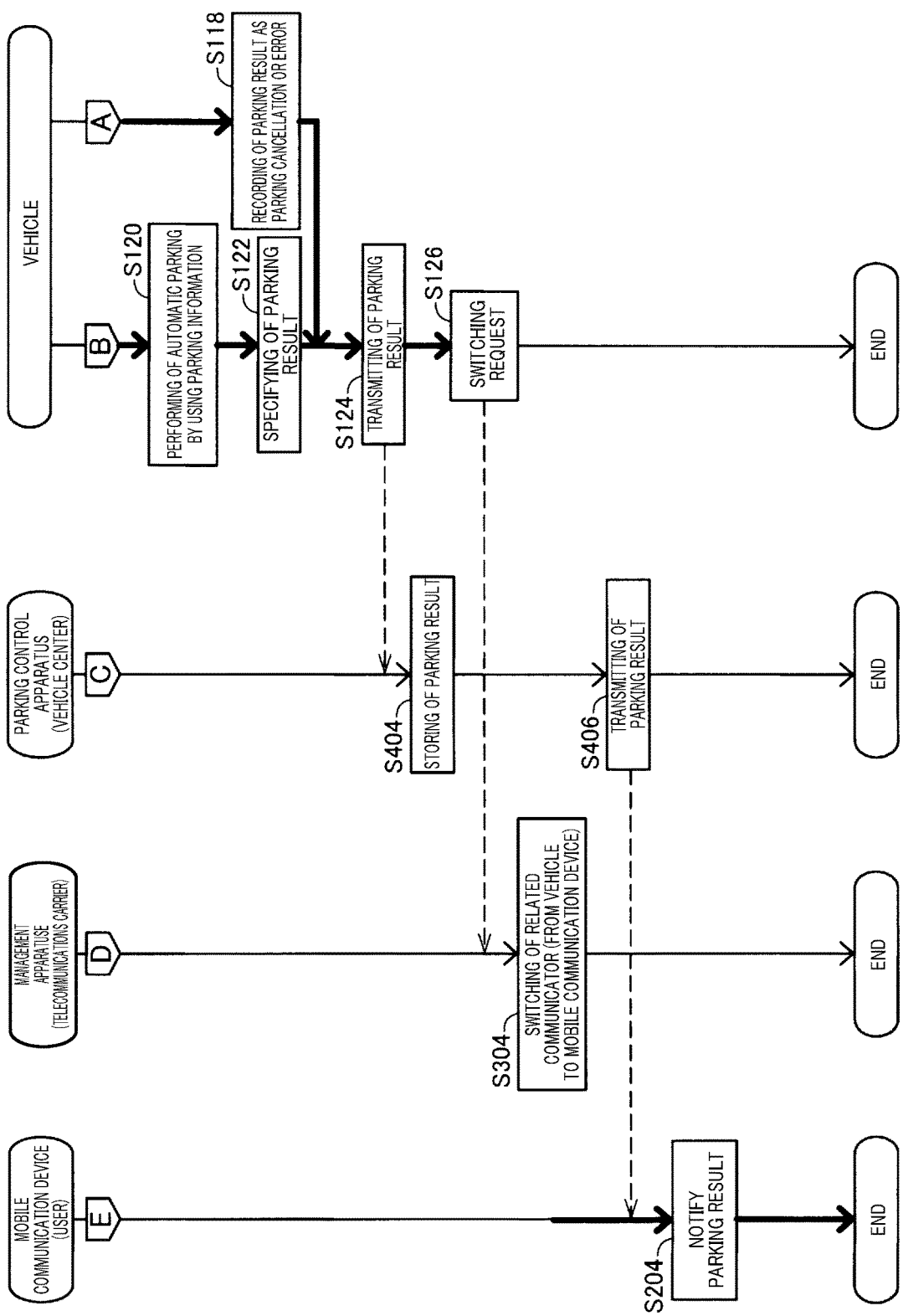
FIG. 5 is a partial sequence diagram showing a procedure of the automatic parking process in the first embodiment.

In the vehicle 100, when the user USR operates the operation unit 17 and instructs automatic parking while the ignition is on, automatic parking process is executed. In the mobile communication device 200 and the parking control apparatus 310, when electric power is turned on, the automatic parking process is executed. The following will describe a situation in which the vehicle 100 is stopped near a home of the user USR. It is assumed that parking information is registered in the parking control apparatus 310 in advance by the user USR. It is assumed that in the situation, the communicator (related communicator/selected communicator) related to the service setting information: 1 is the second communicator 230 in the mobile communication device 200. In FIGS. 4 and 5, in the vehicle 100 and the mobile communication device 200, a period in which the communicator set as the selected communicator is the own communicator (the first communicator 18 or the second communicator 230), is represented by a thick solid line for the sake of convenience of description.

When the user USR exits the vehicle 100 at a stop position to automatically park the vehicle 100 in the parking space P1, the user USR operates the operation unit 17. The parking instruction receiver 12, in the vehicle 100, waits for an instruction for automatic parking from the user USR, that is, until the operation unit 17 is operated by the user USR, and receives the instruction for the automatic parking when the operation unit 17 is operated (step S102).

The automatic driving controller 11 in the vehicle 100, determines whether communication using the wireless communication service of the telecommunications carrier 500 is possible (step S104). For example, when communication data for a test is transmitted to a specific device or an arbitrary device, connected to the network 520 and a response is received, the automatic driving controller 11 may determine that the communication is possible. As described above, when the related communicator is the second communicator 230, the automatic driving controller 11 determined that the communication using the wireless communication service of the telecommunications carrier 500 is not possible (step S104: NO). In the case, the first switching requester 14 transmits a switching request to the mobile communication device 200 via the wireless LAN (step S106).

The switching request in the step S106 may be executed after the instruction for the automatic parking is received (step S102) and after the user USR exits the vehicle 100, more specifically, after it is confirmed that the user USR with the mobile communication device 200 exits the vehicle 100. It is also assumed that the instruction of the automatic parking and the subsequent automatic parking are executed in the state in which the user USR has entered the vehicle 100. In the case, when the user USR uses the communicator (the second communicator 230) in the mobile communication device 200 that is faster in a communication speed than the communicator (the first communicator 18) in the vehicle 100, external communication can be executed more comfortably. Therefore, when it is not confirmed that the user USR (mobile communication device 200) exits the vehicle 100, the switching request in the step S106 is not transmitted, and the related communicator is kept as the second communicator 230, and then a step S108 described later and subsequently processes may be executed.

When the second switching requester 214 in the mobile communication device 200 receives the switching request from the first communicator 18, the second switching requester 214 transmits the switching request to the management apparatus 530 (step S202). When the management apparatus 530 receives the switching request, the management apparatus 530 switches the communicator related to the service setting information: 1 from the second communicator 230 having the ID: 02 to the first communicator 18 having the ID: 01 (step S302).

The parking control apparatus 310 in the vehicle center 300 transmits the pre-registered parking information to the vehicle 100 (the first communicator 18) by using the wireless communication service of the telecommunications carrier 500 in accordance with the request from the vehicle 100 (step S402). After the active communicator is switched to the first communicator 18, the first communicator 18 transmits a request for the parking information, and receives the parking information.

When the automatic driving controller 11 in the vehicle 100, determines in the step S104 described above that the communication using the wireless communication service of the telecommunications carrier 500 is possible (step S104: YES), or after the step S106 is executed, that is, more accurately, after the step S106 is executed and the step S302 is executed, the automatic driving controller 11 acquires the parking information via the first communicator 18 (step S108).

The parking possibility determiner 15 in the vehicle 100, determines whether automatic parking is possible based on the parking information acquired in the step S108 (step S110). For example, when the parking information does not include the position information of the parking lot PA and the information on the position of the parking space P1 in the parking lot PA, or the region in which parking is possible, or when a distance to the parking lot PA is equal to a predetermined distance or greater, or a time required to reach the parking lot PA is equal to a predetermined time or greater, or when a route to the parking lot PA cannot be set due to a situation such as an accident, the parking possibility determiner 15 determines that the automatic parking cannot be executed in accordance with the parking information.

When the parking possibility determiner 15 determines that the automatic parking cannot be executed in accordance with the parking information (step S110: NO), the automatic driving controller 11 transmits a correction request for correcting the parking information to the parking control apparatus 310 (step S114). At the time, the correction request is transmitted by the wireless communication service of the telecommunications carrier 500 via the first communicator 18. The automatic driving controller 11 determines whether it has received the parking information corrected (hereinafter, referred to as correction information) within a predetermined time (hereinafter, referred to as first threshold period) after the step S114 is executed (step S116). When the parking possibility determiner 15 determines that the correction information is received within the first threshold period (step S116: YES), the process returns to the step S108 described above. On the other hand, when the parking possibility determiner 15 determines that the correction information is not received within the first threshold period (step S116: NO), the result transmitter 13 records the parking result as a parking cancellation or an error as shown in FIG. 5 (step S118).

When the parking possibility determiner 15 determines in the step S110 described above that the automatic parking is possible in accordance with the parking information (step S110: YES), the first user entry detector 16 in the vehicle 100 detects that the user USR has exited the vehicle 100 as shown in FIG. 4 (step S112).

As shown in FIG. 5, the automatic driving controller 11 in the vehicle 100 performs the automatic parking by using the parking information received from the parking control apparatus 310 (step S120). The result transmitter 13 in the vehicle 100, specifies the parking result (step S122). When the automatic driving is executed normally, and the vehicle 100 is parked in the parking space P1 within a predetermined time (hereinafter, referred to as second threshold period), parking completion is set as the parking result. On the other hand, for example, when the parking is not completed within the second threshold period since the execution of the automatic parking starts, due to, for example, a traffic jam during automatic driving or an occurrence of an accident, parking non-completion is set as the parking result. The second threshold period may be set in accordance with the distance to the position of the parking lot PA or the position of the parking space P1, from the start position of the automatic parking.

The result transmitter 13 in the vehicle 100 transmits the parking result to the parking control apparatus 310 via the first communicator 18 (step S124). The parking result corresponds to the parking result specified in the step S122 or parking cancellation or an error, recorded in the step S118.

After the step S124 is executed, the first switching requester 14 transmits a switching request to the management apparatus 530 (step S126).

The parking control apparatus 310 receives the parking result from the vehicle 100 and stores the parking result (step S404). The parking control apparatus 310 transmits the parking result to the mobile communication device 200 by using the wireless communication service of the telecommunications carrier 500 (step S406).

When the management apparatus 530 of the telecommunications carrier 500 receives the switching request transmitted in the step S126 from the vehicle 100, the management apparatus 530 switches the communicator related to the service setting information: 1 from the first communicator 18 having the ID: 01 to the second communicator 230 having the ID: 02 (step S304). That is, the active communicator is switched from the first communicator 18 to the second communicator 230 by the management apparatus 530.

After the active communicator is switched to the second communicator 230, the parking result, transmitted from the parking control apparatus 310 to the mobile communication device 200 in the step S406 described above, is received by the mobile communication device 200. The result notifier 216 in the mobile communication device 200 notifies the user USR of the received parking result by displaying the received parking result on the display unit 240 (step S204). Thus, the user USR can be informed of the result of the automatic parking by the parking result displayed on the display unit 240 of the mobile communication device 200.

A3. Automatic Pick-up Process

Figure 6:
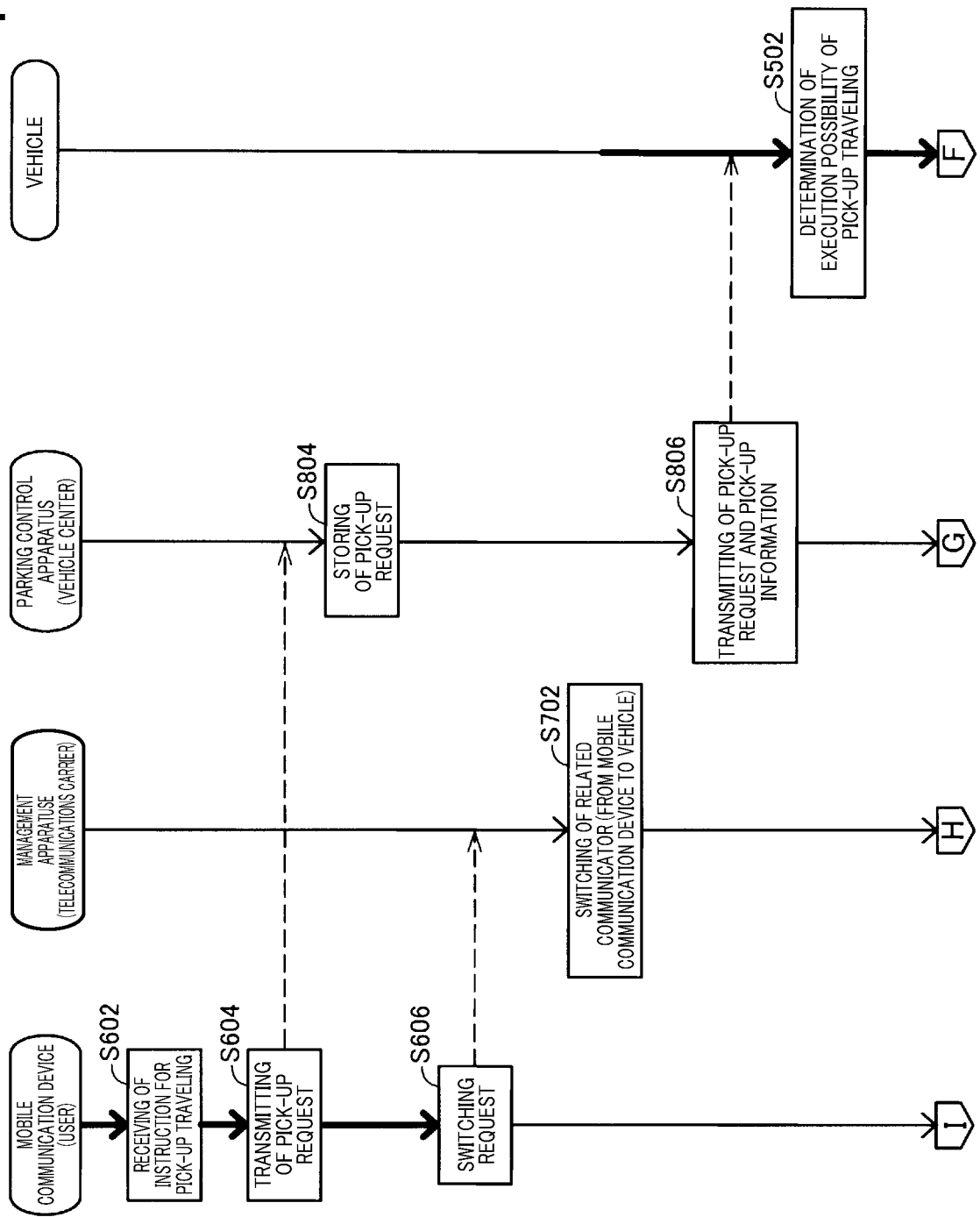
FIG. 6 is a partial sequence diagram showing a procedure of an automatic pick-up process in the first embodiment.

When the ignition is off in the vehicle 100, the automatic driving controller 11, the result transmitter 13, the first switching requester 14, and the parking possibility determiner 15 are in a standby state and an automatic pick-up process is being executed by electric power supply by a battery not shown. In the mobile communication device 200 and the parking control apparatus 310, when electric power is turned on, an automatic parking process is executed. The following will be described in a situation in which the above-described automatic parking process is executed and the vehicle 100 is parked in the parking space P1. It is assumed that pick-up information is registered in the parking control apparatus 310 in advance by the user USR. In addition, the communicator (related communicator/selected communicator) related to the service setting information: 1 by the above-described automatic parking process, is the second communicator 230 in the mobile communication device 200. As shown in FIGS. 6 and 7, similarly to in FIGS. 4 and 5, in the vehicle 100 and the mobile communication device 200, the period in which the communicator set as the selected communicator is the own communicator (the first communicator 18 or the second communicator 230), is represented by a thick solid line for the sake of convenience of description. That is, the period in which the active communicator is the own communicator is represented by a thick solid line for the sake of convenience of description.

In order to instruct the vehicle 100 to pick up the user USR near the home of the user USR, the user USR selects the automatic pick-up process from the menu screen displayed on the display unit 240. The pick-up instruction receiver 212, in the mobile communication device 200, waits until the instruction for the pick-up traveling is given by the user USR, that is, until the menu operation for the automatic pick-up process is executed by the user USR. When the operation is executed, the pick-up instruction receiver 212 receives the instruction for pick-up traveling (step S602). The pick-up request transmitter 213 in the mobile communication device 200 transmits a pick-up request to the parking control apparatus 310 using the wireless communication service (step S604). The second switching requester 214 in the mobile communication device 200 transmits a switching request to the management apparatus 530 using the wireless communication service (step S606). When the management apparatus 530 receives the switching request, the management apparatus 530 switches the communicator related to the service setting information: 1 from the second communicator 230 having the ID: 02 to the first communicator 18 having the ID: 01 (step S702). That is, the active communicator is switched from the second communicator 230 to the first communicator 18 by the management apparatus 530.

When the parking control apparatus 310 receives the pick-up request from the mobile communication device 200, the parking control apparatus 310 stores the pick-up request (step S804). The parking control apparatus 310 transmits the pick-up request and the pick-up information to the vehicle 100 using the wireless communication service (step S806). The pick-up request and the pick-up information transmitted in the step S806 described above are received by the vehicle 100 after the active communicator is switched to the first communicator 18.

The parking possibility determiner 15 in the vehicle 100, receives the pick-up information transmitted in the step S806 and then determines whether pick-up traveling can be executed in accordance with the pick-up information (step S502). For example, when a route cannot be set due to a situation such as an accident on the route, or when a distance to a destination is equal to a predetermined distance or greater, or when a predetermined time or more is required until the vehicle 100 arrives to the destination, the parking possibility determiner 15 determines that the pick-up traveling cannot be executed in accordance with the pick-up information.

As shown in FIG. 7, the parking possibility determiner 15 in the vehicle 100 transmits the determination result in the step S502, that is, the determination result of the execution possibility of the pick-up traveling, to the parking control apparatus 310 using the wireless communication service (step S504). The parking possibility determiner 15, in the vehicle 100, determines whether the determination result in the step S502 is a result that the execution of the pick-up traveling is possible, based on the result of the determination in the step S502 (step S506). When the parking possibility determiner 15 determines that pick-up traveling is possible (step S506: YES), the automatic driving controller 11 performs pick-up traveling by using the pick-up information (step S508). The result transmitter 13 in the vehicle 100, specifies the pick-up result (step S510). When the automatic driving is executed normally, and the vehicle 100 arrives to a set position and stops, the pick-up traveling completion is set as the pick-up result. On the other hand, for example, when the vehicle 100 is caught in a traffic jam during the automatic driving and the pick-up traveling is not completed even after a predetermined time passes or when an accident occurs during the automatic driving, the pick-up result of the pick-up traveling non-completion is set as the pick-up result. The result transmitter 13 in the vehicle 100 transmits the pick-up result to the parking control apparatus 310 via the first communicator 18 (step S512). After the step S512 is executed, the first switching requester 14 transmits the switching request to the management apparatus 530 (step S514).

When the parking control apparatus 310 receives the determination result of the execution possibility of the pick-up traveling from the vehicle 100 in the step S504 described above, the parking control apparatus 310 stores the determination result of the execution possibility (step S808). The parking control apparatus 310 determines whether pick-up traveling is possible based on the received determination result of the execution possibility of the pick-up traveling (step S810). When the parking control apparatus 310 determines that the pick-up traveling is possible (step S810: YES), the parking control apparatus 310 waits until the pick-up result is received from the vehicle 100 in the above-described step S512, and stores the pick-up result after receiving the pick-up result (step S812). The parking control apparatus 310 transmits the pick-up result to the mobile communication device 200 using the wireless communication service (step S814).

When the management apparatus 530 receives the switching request transmitted from the vehicle 100 in the step S514 described above, the management apparatus 530 switches the communicator related to the service setting information: 1 from the first communicator 18 having the ID: 01 to the second communicator 230 having the ID: 02 (step S704).

The pick-up result transmitted from the parking control apparatus 310 to the mobile communication device 200 in the step S814 described above is received by the mobile communication device 200 after the active communicator is switched to the second communicator 230. The result notifier 216, in the mobile communication device 200, notifies the user USR of the received pick-up result by displaying the received pick-up result on the display unit 240 (step S608). Thus, the user USR can be informed of the result of the pick-up traveling by the pick-up result displayed on the display unit 240 of the mobile communication device 200.

In accordance with the parking system 10 according to the first embodiment described above, after the result transmitter 13 transmits the parking result to the parking control apparatus 310, the first switching requester 14 in the vehicle 100 transmits the switching request for switching the active communicator from the first communicator 18 to the second communicator 230. When the parking control apparatus 310 receives the parking result, the parking control apparatus 310 stores the parking result until the active communicator is switched from the first communicator 18 to the second communicator 230, and transmits the parking result to the mobile communication device 200 by using the wireless communication service after the active communicator is switched to the second communicator 230. As a result, the communication by the mobile communication device 200, and the automatic parking can be executed by using the communication based on the single contract of the wireless communication service provided by the telecommunications carrier 500. In addition, the mobile communication device 200 can receive the execution results of the automatic parking (parking result).

Since the automatic driving controller 11 controls the automatic driving by using the parking information received from the parking control apparatus 310 via the first communicator 18, the vehicle 100 can be parked automatically by performing the automatic driving even if the parking information is not stored in the vehicle 100 in advance.

In the case in which the automatic parking cannot be executed in accordance with the parking information, when correction of the parking information is requested to the parking control apparatus 310, and the corrected parking information is not received within the predetermined first threshold period, the parking result that conveys that the automatic parking is not completed is transmitted to the parking control apparatus 310. As a result, the mobile communication device 200 can receive the parking result that conveys that the automatic parking is not completed. Therefore, the user USR can be informed that the automatic parking has not been completed.

When the execution of the automatic parking starts and the predetermined second threshold period passes, the parking result that conveys that automatic parking is not completed, is transmitted to the parking control apparatus 310. As a result, when the automatic parking is not completed due to some trouble such as being caught in a traffic jam during the automatic driving for the automatic parking, the user USR can be informed that the automatic parking has not been completed.

When the pick-up request is transmitted, the second switching requester 214 transmits the switching request for switching the active communicator from the second communicator 230 to the first communicator 18 to the management apparatus 530, and the parking control apparatus 310 stores the pick-up request until the active communicator is switched to the first communicator 18 and transmits the pick-up request by using the wireless communication service after the active communicator is switched to the first communicator 18. As a result, the exchange of the pick-up request between the mobile communication device 200 and the vehicle 100 can be performed by communication using only a single contract for wireless communication provided by the telecommunications carrier 500. In addition, the mobile communication device 200 can receive the execution results (pick-up results) of the pick-up traveling.

B. Second Embodiment

The parking system 10 in the second embodiment differs from that in the first embodiment in the procedure of the automatic pick-up process. The system configuration of the parking system 10 and the procedure of the automatic parking process, in the second embodiment are the same as those in the first embodiment. Therefore, the same components and the same procedures are denoted by the same reference numerals, and the detailed description thereof is omitted.

In the automatic pick-up process in the second embodiment, after the procedure shown in FIG. 6 is executed, the procedures of FIGS. 8 and 9 are executed. The procedures in the vehicle 100 and the parking control apparatus 310 in the second embodiment, are the same as those in the first embodiment. The procedure in the mobile communication device 200 in the second embodiment differs from that in the first embodiment in that steps S610 and S612 are additionally executed. The procedure of the management apparatus 530 in the second embodiment differs from that in the first embodiment in that a step S706 is additionally executed.

After the above-described step S608 shown in FIG. 8 is executed and the pick-up result is notified, the second user entry detector 215 in the mobile communication device 200 determines whether entry of the user USR to the vehicle 100 is detected as shown in FIG. 9 (step S610). When the second user entry detector 215 determines that entry of the user USR is not detected (step S610: NO), the step S610 is executed again. On the other hand, when the second user entry detector 215 determines that entry is detected (step S610: YES), the second switching requester 214 in the mobile communication device 200 transmits the switching request to the management apparatus 530 using the wireless communication service (step S612). When the management apparatus 530 receives the switching request, the management apparatus 530 switches the communicator related to the service setting information: 1 from the second communicator 230 having the ID: 02 to the first communicator 18 having the ID: 01 (step S706). As described above, in the state in which the user USR has entered the vehicle 100, the vehicle 100 can perform communication using the wireless communication service of the telecommunications carrier 500 via the first communicator 18. Therefore, for example, the automatic driving controller 11 can acquire traffic information such as a position and a distance of a traffic jam from the parking control apparatus 310 or other external apparatuses, and can perform the automatic driving based on the traffic information.

The parking system 10 in the second embodiment described above has the same effects as that in the first embodiment. In addition, the second switching requester 214 transmits the switching request to the management apparatus 530 for switching the active communicator from the second communicator 230 to the first communicator 18 after entry of the user USR to the vehicle 100 is detected. As a result, the vehicle 100 can use the wireless communication service via the first communicator 18 after the user USR enters the vehicle. Moreover, the automatic driving controller 11 communicates by a means such as tethering without intervention of the mobile communication device 200, so that a communication performance necessary for the automatic driving control can be secured without being influenced by the communication performance and communication state of the mobile communication device 200.

C. Third Embodiment

The parking system 10 in the third embodiment differs from that in the first embodiment in the procedure of the automatic parking process. The system configuration of the parking system 10 and the procedure of the automatic pick-up process, in the second embodiment are the same as those in the first embodiment, so that the same components and the same procedures are denoted by the same reference numerals, and the detailed description thereof is omitted. In the third embodiment, the vehicle 100 is configured such that an electric power supply apparatus installed in a parking lot supplies electric power to a secondary battery mounted on the vehicle 100. For example, a vehicle utilizing power of a motor driven by electric power supply from a secondary battery in a vehicle such as a plug-in hybrid vehicle, corresponds to the vehicle 100. In the automatic parking process in the third embodiment, electric power is supplied to the secondary battery of the vehicle 100 while the vehicle 100 is parked in a parking lot. While electric power is supplied to the vehicle 100, the active communicator is switched from the first communicator 18 to the second communicator 230. The following will be described specifically.

In the automatic parking process in the third embodiment shown in FIGS. 10 to 14, the vehicle 100 in the third embodiment differs from that in the first embodiment in that steps S102a, S108a, S110a, S114a, S118a, S120a, S122a, and S124a are executed instead of the steps S102, S108, S110, S114, S118, S120, S122, and S124, respectively, and in that steps S123a and 123b are additionally executed. The procedure of the mobile communication device 200 in the third embodiment differs from that in the first embodiment in that steps S203a, S203b, S203c, and S206 are additionally executed. The procedure of the management apparatus 530 in the third embodiment differs from that in the first embodiment in that steps S303a and S303b are additionally executed. The procedure of the parking control apparatus 310 in the third embodiment differs from that in the first embodiment in that steps S402a, S404a, and S406a are executed instead of the steps S402, S404, and S406, respectively, and in that steps S403a, S403b, S403c, and S403d are additionally executed.

As shown in FIG. 10, the parking instruction receiver 12 in the vehicle 100 receives an electric power supply instruction in addition to the instruction for the automatic parking (step S102a). The parking control apparatus 310 in the vehicle center 300 repeatedly transmits the parking information and electric power supply information for electric power supply, registered in advance, to the vehicle 100 (first communicator 18), by using the wireless communication service of the telecommunications carrier 500 (step S402a). The electric power supply information includes, for example, a position of an electric power supply apparatus in a parking lot, an electric power supply method, an electric power supply performance, availability of the electric power supply apparatus, electric power supply cost, and abnormality information.

The automatic driving controller 11 in the vehicle 100 acquires the parking information and the electric power supply information via the first communicator 18 (step S108a). The parking possibility determiner 15 in the vehicle 100 determines whether automatic parking can be executed based on the parking information acquired in the step S108a, and whether electric power supply can be performed based on the electric power supply information acquired in the step S108a (step S110a). For example, when the electric power supply method included in the electric power supply information does not match the electric power supply method in the vehicle 100, the parking possibility determiner 15 determines that the electric power supply cannot be executed.

When the parking possibility determiner 15 determines that at least one of the automatic parking and the electric power supply is not possible (step S110a: NO), the automatic driving controller 11 in the vehicle 100 transmits a correction request for correcting the parking information and the electric power supply information to the parking control apparatus 310 (step S114a). After the step S114a is executed, the above-described step S116 is executed. When the parking possibility determiner 15 determines that both of the automatic parking and the electric power supply can be performed (step S110a: YES), the above-described step S112 is executed.

As shown in FIG. 11, after the above-described step S112 is executed, the automatic driving controller 11 in the vehicle 100 performs automatic parking by using the parking information received from the parking control apparatus 310 and performs the electric power supply by using the electric power supply information (step S120a). In the step S116 described above, when it is determined that the correction information is not received within the first threshold period (step S116: NO), the result transmitter 13 records the results of the automatic parking and the electric power supply as a cancellation or an error about the automatic parking and the electric power supply (step S118a).

After the step S120a described above is executed, or after the step S118a is executed, the result transmitter 13 in the vehicle 100 transmits the electric power supply information to the parking control apparatus 310 via the first communicator 18 (step S123a). In the present embodiment, the electric power supply information means information including information indicating a start or a failure, of the electric power supply, and an electric power supply schedule (for example, a time required for the electric power supply and a time of the electric power supply completion). After the step S123a is executed, the first switching requester 14 transmits the switching request to the management apparatus 530 (step S123b).

When the parking control apparatus 310 in the vehicle center 300 receives the electric power supply information from the vehicle 100, the parking control apparatus 310 stores the electric power supply information (step S403a). In addition, the parking control apparatus 310 transmits the electric power supply information to the mobile communication device 200 by using the wireless communication service of the telecommunications carrier 500 (step S403b).

When the management apparatus 530 of the telecommunications carrier 500 receives the switching request transmitted from the vehicle 100 in the step S123b, the management apparatus 530 switches the active communicator from the first communicator 18 to the second communicator 230 (step S303a).

The electric power supply information, transmitted from the parking control apparatus 310 to the mobile communication device 200 in the step S403b described above, is received by the mobile communication device 200 after the active communicator is switched to the second communicator 230. The result notifier 216 in the mobile communication device 200 notifies the user USR of the received electric power supply information by displaying the received electric power supply information on the display unit 240 (step S203a). Thus, the user USR can be informed the information including the electric power supply information, that is, the information indicating the start or the failure, of the electric power supply, and the electric power supply schedule (for example, a time required for the electric power supply or a time of the electric power supply completion) by the parking result displayed on the display unit 240 of the mobile communication device 200.

As shown in FIG. 12, after the time of the electric power supply completion, specified based on the electric power supply information, passes or after the time (a predetermined time) included in the electric power supply information and required for the electric power supply, passes, the second switching requester 214 in the mobile communication device 200 transmits a status transmission request to the parking control apparatus 310 (step S203b). The status transmission request means requesting transmission of a status regarding the automatic parking and the electric power supply. The second switching requester 214 in the mobile communication device 200 transmits the switching request after the step S203b is executed (step S203c). When the management apparatus 530 receives the switching request, the management apparatus 530 switches the active communicator from the second communicator 230 to the first communicator 18 (step S303b).

When the parking control apparatus 310 in the vehicle center 300 receives the status transmission request from the mobile communication device 200, the parking control apparatus 310 stores the status transmission request (step S403c). In addition, the parking control apparatus 310 transmits the status transmission request to the mobile communication device 200 by using the wireless communication service of the telecommunications carrier 500 (step S403d).

As described above, when the step S303b is executed and the active communicator is switched to the first communicator 18 in the vehicle 100, the vehicle 100 receives the status transmission request. In the case, the result transmitter 13 in the vehicle 100 specifies the results of the parking and the electric power supply (step S122a). In addition, as shown in FIG. 13, the result transmitter 13 transmits the specified results of the parking and the electric power supply to the parking control apparatus 310 (step S124a), and then, the first switching requester 14 in the vehicle 100 transmits the switching request to the management apparatus 530 (step S126).

The parking control apparatus 310 in the vehicle center 300 stores the results of the parking and the electric power supply (step S404a). When the active communicator is switched to the second communicator 230 in the mobile communication device 200, the parking control apparatus 310 transmits the results of the parking and the electric power supply to the mobile communication device 200 (step S406a).

When the management apparatus 530 receives the switching request in the step S126 from the vehicle 100, the management apparatus 530 executes the above-described step S304, and switches the active communicator from the first communicator 18 to the second communicator 230. When the result notifier 216 in the mobile communication device 200 receives the results of the parking and the electric power supply from the parking control apparatus 310, the result notifier 216 notifies the user USR of the results of the parking and the electric power supply by displaying the results of the parking and the electric power supply on the display unit 240 (step S204a). Then, the second communicator 230 in the mobile communication device 200 determines whether the electric power supply is completed based on the results of the parking and the electric power supply (step S206). When it is determined that the electric power supply is completed (step S206: YES), the automatic parking process is completed in the mobile communication device 200. On the other hand, when it is determined that the electric power supply is not completed (step S206: NO), the above-described step S203b shown in FIG. 12 is executed.

The parking system 10 in the third embodiment described above has the same effects as that in the first embodiment. In addition, since the active communicator is switched to the second communicator 230 in the mobile communication device 200 while the vehicle 100 is supplied with electric power in the parking lot, a period in which the mobile communication device 200 cannot perform communication using the wireless communication service of the telecommunications carrier 500 can be shortened. In general, while the vehicle 100 is supplied with electric power, there is no need to perform constant communication in the vehicle 100, and it is possible to control a stop of electric power supply in the electric power supply facility or the vehicle 100. Therefore, in such a configuration, the possibility that problems occur in the vehicle 100 is low.

D. Other Embodiments

D1. First Modified Example

In the second embodiment, after the notification of the pick-up result is executed in the mobile communication device 200 (after the execution of the step S608), the detection of entry of the user USR is executed in the mobile communication device 200. However, the detection of entry of the user USR may be executed in the vehicle 100 (first user entry detector 16) instead of the mobile communication device 200. In this configuration, when the first user entry detector 16 detects entry of the user USR, the first switching requester 14 may transmit the switching request to the mobile communication device 200 by using the wireless LAN. When the first switching requester 14 in the vehicle 100 receives the switch request from the mobile communication device 200, the first switching requester 14 may execute the above-described step S612 (transmission of the switching request).

D2. Second Modified Example

In each embodiment, the automatic driving controller 11 receives the parking information from the parking control apparatus 310 via the first communicator 18, but the present disclosure is not limited to this configuration. The parking information may be set (stored) in the vehicle 100 in advance. In this configuration, for example, when the user USR has entered the vehicle 100, the user USR operates the mobile communication device 200 to input the parking information so that the parking information is transmitted to the vehicle 100 and set in the vehicle 100 by using wired communication such as Universal Serial Bus (USB) or wireless communication such as a wireless LAN or a Bluetooth interface. In addition, for example, the parking information may be set in the vehicle 100 by setting the parking space P1 as a target destination by using a navigation device (not shown).

D3. Third Modified Example

In each embodiment, it is determined whether automatic parking can be executed based on the parking information. When it is determined that the automatic parking cannot be executed, the correction request for correcting the parking information is transmitted to the parking control apparatus 310, but the present disclosure is not limited to this configuration. When it is determined that the automatic parking cannot be executed, transmission of the correction request for correcting the parking information may be omitted and the step S118 may be executed to record the parking result of an error.

D4. Fourth Modified Example

In each embodiment, when the second threshold period passes since the execution of the automatic parking starts, the parking result that conveys that the automatic parking is not completed, is transmitted to the parking control apparatus 310, but the present disclosure is limited to this configuration. The determination of non-completion of the automatic parking based on the elapsed time since the execution of the automatic parking starts, may be omitted.

D5. Fifth Modified Example

In each embodiment, the parking information may be configured such as not to include the position information of the parking space P1 and the information on the region in which the parking is possible. In this configuration, the vehicle 100 may independently search for the parking space after automatically traveling to the parking lot PA. Alternatively, the vehicle 100 may acquire the information on the position of the parking space and the region in which the parking is possible from an apparatus installed in the parking lot PA using the wireless communication service. In addition, in this configuration, the position information of the parking space may be included in the parking result and the parking result may be transmitted from the vehicle 100 to the mobile communication device 200. Thus, the user USR can be informed where the parking space is in the parking lot PA, and where the vehicle 100 is parked.

D6. Sixth Modified Example

In each embodiment, the automatic parking process or the automatic pick-up process may be omitted. In the configuration in which the automatic pick-up process is omitted, for example, as exemplified in the above-described Embodiment 5 of Other Embodiments, the parking result is configured to include the position information of the parking space, so that the user USR can go to the parking space and enter the vehicle 100. As can be understood from the configuration and each embodiment, the parking system includes the vehicle and the mobile communication device. The vehicle includes the first communicator that performs communication using the wireless communication service provided by the telecommunications carrier. The mobile communication device includes the second communicator that performs communication using the wireless communication service. The first communicator and the second communicator are configured to be able to communicate selectively by using the same information as the service setting information including the identification number and the authentication information for the wireless communication service. At least one of the vehicle and the mobile communication device enables the first communicator to communicate by using the wireless communication service in at least one of the first period during the execution of the automatic parking and the second period during the execution of the pick-up traveling by transmitting the switching request for switching of the active communicator to the management apparatus. Such a system may be applied to the parking system according to the present disclosure.

D7. Seventh Modified Example

In each embodiment, the mobile communication device 200 is constituted by a smartphone, but instead of the smartphone, an arbitrary communication device owned by the user USR, such as a mobile phone device and a personal computer, may be used.

D8. Eighth Modified Example

In each embodiment, the step S126 of the automatic parking process may be omitted. In this configuration, the related communicator is the first communicator 18 while the vehicle 100 is parked. In addition to the second communicator 230, the mobile communication device 200 includes a communicator capable of executing communication that is different from the communication by the wireless communication service provided by the telecommunications carrier 500, for example, communication via a wireless LAN (hereinafter, referred to as third communicator). The mobile communication device 200 may receive the parking result from the vehicle 100 by communication via the third communicator. When the user USR exits the vehicle 100 and is in an environment where the wireless LAN can be used, the user USR can confirm the parking result in the mobile communication device 200. In this configuration, the vehicle 100 may transmit the parking result directly to the mobile communication device 200 without intervention of the parking control apparatus 310. Thus, in the parking control apparatus 310, the function of storing the parking result and the function of transmitting the parking result may be omitted. In addition, as exemplified in the above-described Other Embodiment 2 of Other Embodiments, the parking information is configured to be set in the vehicle 100 in advance or the parking information is configured to be set directly in the vehicle 100 by the user USR, so that the parking control apparatus 310 may be omitted.

As described above, in the configuration in which the step S126 of the automatic parking process is omitted, the mobile communication device 200 may transmit the pick-up request by the communication via the third communicator in the step S604 of the automatic pick-up process. In this configuration, the mobile communication device 200 may transmit the pick-up request directly to the vehicle 100 without intervention of the parking control apparatus 310. The mobile communication device 200 may receive the pick-up result from the vehicle 100 by the communication via the third communicator. The vehicle 100 may transmit the pick-up result directly to the mobile communication device 200 without intervention of the parking control apparatus 310.

D9. Ninth Modified Example

During the execution of the step S120 (automatic parking) of the automatic parking process in the first and second embodiments, when a predetermined condition is met, or periodically, the execution status of the automatic parking may be transmitted from the vehicle 100 to the parking control apparatus 310. In the case, the first switching requester 14 in the vehicle 100 transmits the switching request after the execution status is transmitted to the parking control apparatus 310. Then, after the active communicator is switched to the second communicator 230, the parking control apparatus 310 transmits the execution status to the mobile communication device 200 by using the wireless communication service provided by the telecommunications carrier 500. The result notifier 216 in the mobile communication device 200 notifies the user USR of the execution status. Then, the second switching requester 214 in the mobile communication device 200 transmits the switching request. Thus, the active communicator is switched to the first communicator 18 in the vehicle 100 again, and the vehicle 100 executes the process of the step S122 and subsequently steps.

The above-described configuration is also applicable to the step S508 of the automatic pick-up process in the first and second embodiments. That is, during the execution of the step S508 (pick-up traveling), when a predetermined condition is met, or periodically, the execution status of the pick-up traveling may be transmitted from the vehicle 100 to the parking control apparatus 310. The above-described configuration is similarly applicable to the step S120a (automatic parking and electric power supply) of the automatic parking process in the third embodiment and the step S508 (pick-up traveling) of the automatic pick-up process in the third embodiment.

The above-described predetermined condition may correspond to, for example, at least one of the case in which the vehicle stops at a red light, the case in which a predetermined time passes since a start of the automatic parking, the electric power supply, or the pick-up traveling, the case in which the vehicle travels at a speed equal to a predetermined speed or less, the case in which the vehicle is planned to perform steady traveling by the automatic driving, and the case in which the vehicle travels on a road with good visibility, such as a highway. The above-described condition in which the vehicle is planned to perform steady traveling by the automatic driving means that a complicated process is not planned in the automatic driving. For example, the condition corresponds to the case in which the vehicle travels along a road of a planned route, and right and left turns are not planned, the case in which there are few vehicles around the own vehicle, and the case in which a lane change is not planned. As an example of the above-described configuration, it is assumed, for example, that when a predetermined time passes since the start of the automatic parking, and the vehicle stops at a red light, an execution status is transmitted, or that when the vehicle travels along a highway without making right and left turns, and a predetermined time passes since the start of the automatic parking, and the vehicle speed becomes a speed equal to a predetermined speed or less, the execution status is transmitted.

The above-described execution status corresponds to, for example, a current position of the vehicle 100, an estimated arrival time to the destination, an energy status, and presence or absence of abnormality. The energy status means, for example, a State of Charge (SOC) of a secondary battery and a remaining amount of fuel.

The above-described configuration allows the user USR to know the execution status during the execution of the automatic parking, the electric power supply, and the pick-up traveling.

D10. Tenth Modified Example

When the parking result specified in the step S122 of the automatic parking process in the first and second embodiments and the step S122a in the third embodiment is a result of parking non-completion (error), the parking instruction may be made by the mobile communication device 200 again. In this configuration, the process of the steps S102 to S110, S114, and S116 in the vehicle 100, shown in FIG. 4, is executed in the mobile communication device 200 to determine the parking information. Then, the parking instruction including the parking information may be transmitted to the vehicle 100, and then the step S202 (transmission of switching request) may be executed. The parking instruction including the parking information is stored by the parking control apparatus 310 in the vehicle center 300, and then received by the vehicle 100 after the active communicator is switched to the first communicator 18 in the vehicle 100. In the case, in the vehicle 100, the process of the step S120 and subsequently steps is executed.

In addition, for example, when the parking result specified in the step S122 of the automatic parking process in the first and second embodiments and the step S122a in the third embodiment is parking non-completion, the process of the step S602 and subsequently steps, of the automatic pick-up process, shown in FIG. 6, in the mobile communication device 200, may be executed. That is, when the parking result is parking non-completion, the vehicle 100 may be controlled to perform pick-up traveling to a place planned for pick-up without being controlled to perform the automatic parking.

The above-described configuration can prevent the vehicle 100 from remaining in a place when the parking result is parking non-completion. As a result, the user USR can be prevented from having to go to the stopped place, so that the convenience can be improved.

D11. Eleventh Modified Example

In each embodiment, when a predetermined time passes and the automatic parking or the pick-up parking is not completed normally, the parking non-completion or pick-up traveling non-completion is set as the parking result, and stored, and the result is displayed in the mobile communication device 200 after the active communicator is switched, but the present disclosure is not limited to this configuration. For example, when a sensor such a collision detector detects that the vehicle 100 suffers an accident during the execution of the automatic parking or the pick-up traveling even before a predetermined time passes, the parking non-completion or the pick-up non-completion may be set the parking result and stored, and then the result may be displayed on the mobile communication device 200 after the active communicator is switched.

D12. Twelfth Modified Example

In each embodiment, since the wireless communication by the first communicator 18 and the wireless communication by the second communicator 230 use a common piece of the service setting information, the wireless communication by the first communicator 18 and the wireless communication by the second communicator 230 are performed in an alternately switching manner, in other words, not performed both at the same time. However, the present disclosure is not limited to this configuration. For example, any one of the wireless communication by the first communicator 18 and the wireless communication by the second communicator 230 may be configured to be executed via the third communicator different from the first communicator 18 and the second communicator 230, and the wireless communications may be executed without switching (in parallel). In other words, any one of the first communicator 18 and the second communicator 230 communicates via the third communicator, and the other communicator (the communicator which cannot use the communication via the third communicator) may be related to the service setting information and execute the wireless communication using the wireless communication service provided by the telecommunications carrier 500.

D13. Thirteenth Modified Example

In each embodiment, the contract of the wireless communication service related to the service setting information: 1 is made by the user USR, but may be made by a third party different from the user USR. In this configuration, for example, the user USR may apply for use of the wireless communication service related to the service setting information: 1 to the third party and the third party may apply for the IDs (01 and 02) that the user USR uses as the ID which should be related to the service setting information, to a telecommunications carrier. The configuration in the present embodiment has the same effects as that in each embodiment.

D14. Fourteenth Modified Example

In each embodiment, a part of the configuration realized by hardware may be replaced by software. Conversely, a part of the configuration realized by software may be replaced by hardware. For example, at least one functional unit of the automatic driving controller 11, the parking instruction receiver 12, the result transmitter 13, the first switching requester 14, the parking possibility determiner 15, and the first user entry detector 16, in the vehicle 100 may be realized by an integrated circuit, a discrete circuit, or a module combining such circuits. Similarly, at least one functional unit of the communication controller 211, the pick-up instruction receiver 212, the pick-up request transmitter 213, the second switching requester 214, the second user entry detector 215, and the result notifier 216, in the mobile communication device 200 may be realized by an integrated circuit, a discrete circuit, or a module combining such circuits. When a part or all of the functions in the present disclosure are realized by software, the software (computer program) may be provided as stored in a computer-readable recording medium. The computer-readable recording medium is not limited to a portable recording medium such as a flexible disk and a CD-ROM, but includes an internal storage device in computers, such as various RAMs and ROMs, and an external storage device fixed to computers, such as a hard disk. That is, the computer-readable recording medium has a broad meaning including an arbitrary recording medium that does not store data packets in a transitory manner, but can store data packets in a persistent manner.

The present disclosure is not limited to the above-described embodiments, but may be realized in various configurations without departing from the scope of the present disclosure. For example, the technical features in the embodiments corresponding to the technical features described in the section of the summary of the present disclosure, may be replaced and combined as appropriate to solve a part or all of the problems described above, or to achieve a part or all of the effects described above. In addition, if the technical features are not described as essential in the present specification, the technical features may be deleted as appropriate.

What is claimed is:
1. A parking system comprising:
  a first communicator configured to be mounted on a vehicle and perform communication using a wireless communication service, and
  a second communicator configured to be mounted on a communication device owned by a user of the vehicle and perform communication using the wireless communication service,
  wherein the first and second communicators are configured to be able to communicate with the wireless communication service in a mutually exclusive manner by using the same information as service setting information including an identification number and authentication information for the wireless communication service,
  wherein at least one of the vehicle and the communication device enables the first communicator to communicate by using the wireless communication service in at least one of a first period during execution of automatic parking in which the vehicle is being parked by automatic driving, and a second period during execution of pick-up traveling in which the vehicle travels from a parked position of the vehicle to a set position by automatic driving, by transmitting a switching request for switching of an active communicator that is a communicator related to the service setting information to a management apparatus managing a relationship between the service setting information and a related communicator.
2. The parking system according to claim 1, further comprising an external apparatus, wherein the vehicle further comprises
  a parking instruction receiver receiving an execution instruction to perform the automatic parking, an automatic driving controller controlling automatic driving of the vehicle and controlling the vehicle to perform the automatic parking in accordance with the execution instruction, a result transmitter transmitting a parking result that is a result of execution of the automatic parking to the external apparatus via the first communicator, and a first switching requester transmitting the switching request to the management apparatus via the first communicator, wherein the first switching requester in the vehicle transmits the switching request for switching the active communicator from the first communicator to the second communicator after the result transmitter transmits the parking result to the external apparatus, and when the external apparatus receives the parking result, the external apparatus stores the parking result until the active communicator is switched from the first communicator to the second communicator, and transmits the parking result to the communication device by using the wireless communication service after the active communicator is switched to the second communicator.

3. The parking system according to claim 2,
wherein the automatic driving controller receives parking information for perform automatic parking from the external apparatus via the first communicator and controls the automatic driving by using the parking information.

4. The parking system according to claim 3,
wherein the vehicle further comprises a parking possibility determiner determining whether the automatic driving can be performed by the parking information received from the external apparatus,
wherein
when the parking possibility determiner determines that the automatic driving cannot be performed, the automatic driving controller requests the external apparatus via the first communicator to correct the parking information, and
when the parking information corrected is not received from the external apparatus within a first threshold period that is predetermined, the result transmitter transmits the parking result that conveys that the automatic parking is not completed, to the external apparatus.

5. The parking system according to claim 2,
wherein when a second threshold period that is predetermined passes since execution of the automatic parking starts, the result transmitter transmits the parking result that conveys that the automatic parking is not completed, to the external apparatus.

6. The parking system according to claim 1,
further comprising an external apparatus,
wherein the vehicle further comprises
an automatic driving controller controlling automatic driving of the vehicle and controlling the vehicle to perform the pick-up traveling,
a result transmitter transmitting a pick-up result that is a result of execution of the pick-up traveling, to the external apparatus via the first communicator, and
a first switching requester transmitting the switching request to the management apparatus via the first communicator,
wherein the communication device further comprises a pick-up instruction receiver receiving a pick-up instruction that is an execution instruction of the pick-up traveling, a pick-up request transmitter transmitting a pick-up request for pick-up by the vehicle to the external apparatus via the second communicator in accordance with the pick-up instruction, and a second switching requester transmitting the switching request to the management apparatus via the second communicator, wherein when the pick-up request transmitter transmits the pick-up request, the second switching requester in the communication device transmits the switching request for switching the active communicator from the second communicator to the first communicator, to the management apparatus, when the external apparatus receives the pick-up request, the external apparatus stores the pick-up request until the active communicator is switched from the second communicator to the first communicator, and transmits the pick-up request to the vehicle by using the wireless communication service after the active communicator is switched to the first communicator, and the automatic driving controller in the vehicle controls the vehicle to perform the pick-up traveling in accordance with the pick-up request received via the first communicator.

7. The parking system according to claim 1,
further comprising an external apparatus,
wherein the vehicle further comprises
an automatic driving controller controlling automatic driving of the vehicle and controlling the vehicle to perform the pick-up traveling,
a result transmitter transmitting a pick-up result that is a result of execution of the pick-up traveling to the external apparatus via the first communicator, and
a first switching requester transmitting the switching request to the management apparatus via the first communicator,
wherein the communication device further comprises
a pick-up instruction receiver receiving a pick-up instruction that is an execution instruction of the pick-up traveling,
a pick-up request transmitter transmitting a pick-up request for pick-up by the vehicle to the external apparatus via the second communicator in accordance with the pick-up instruction, and
a second switching requester transmitting the switching request to the management apparatus via the second communicator,
wherein
the result transmitter in the vehicle transmits a pick-up result that is a result of execution of the pick-up traveling to the management apparatus via the first communicator,
after the result transmitter transmits the pick-up result to the external apparatus, the first switching requester in the vehicle transmits the switching request for switching the active communicator from the first communicator to the second communicator, and
when the external apparatus receives the pick-up result, the external apparatus stores the pick-up request until the active communicator is switched from the first communicator to the second communicator, and transmits the pick-up result to the communication device by using the wireless communication service after the active communicator is switched to the second communicator.

8. The parking system according to claim 6, wherein the communication device further comprises a user entry detector detecting entry of the user to the vehicle, and when the user entry detector detects entry of the user to the vehicle, the second switching requester transmits the switching request for switching the active communicator from the second communicator to the first communicator, to the management apparatus.

\* \* \* \* \*